United States Patent [19]

Kato et al.

[11] Patent Number: 5,657,125
[45] Date of Patent: Aug. 12, 1997

[54] APPARATUS INCLUDING A LIGHT-DETECTING ELEMENT HAVING A PHOTO-ELECTRIC CONVERSION SURFACE AND AN INTEGRAL LIGHT BLOCKING MEMBER

[75] Inventors: Shigeki Kato, Tokyo; Koh Ishizuka, Ohmiya; Hiroshi Kondo, Yokohama; Satoshi Ishii; Yasushi Kaneda, both of Tokyo, all of Japan

[73] Assignee: Canon Kabushiki Kaisha, Tokyo, Japan

[21] Appl. No.: 454,501

[22] Filed: May 30, 1995

Related U.S. Application Data

[63] Continuation of Ser. No. 82,541, Jun. 28, 1993, abandoned.

[30] Foreign Application Priority Data

Jun. 30, 1992 [JP] Japan ................. 4-197909
Dec. 24, 1992 [JP] Japan ................. 4-344573
Dec. 28, 1992 [JP] Japan ................. 4-347413

[51] Int. Cl.⁶ ............................................ G01B 9/02
[52] U.S. Cl. ............................ 356/356; 250/237 G
[58] Field of Search .............................. 356/356, 363, 356/400, 401; 250/237 G, 231.14

[56] References Cited

U.S. PATENT DOCUMENTS

| | | | |
|---|---|---|---|
| 4,564,294 | 1/1986 | Ganst | 250/237 G |
| 4,668,093 | 5/1987 | Cahill | 356/345 |
| 4,970,388 | 11/1990 | Nishimura et al. . | |
| 5,038,032 | 8/1991 | Nishimura et al. . | |
| 5,066,129 | 11/1991 | Matsui | 356/356 |
| 5,155,355 | 10/1992 | Kabaya | 250/237 G |
| 5,283,434 | 2/1994 | Ishizuka et al. | 250/237 G |

FOREIGN PATENT DOCUMENTS

| | | |
|---|---|---|
| 4006789 | 9/1991 | Germany . |
| 2099993 | 12/1982 | United Kingdom . |

*Primary Examiner*—Samuel A. Turner
*Attorney, Agent, or Firm*—Fitzpatrick, Cella, Harper & Scinto

[57] ABSTRACT

An apparatus for detecting information relating to displacement of an object on which a grating scale is affixed. The apparatus includes a beam-emitting system for irradiating the grating scale with a beam. The apparatus also includes a light-detecting element having a light-receiving surface. A grating portion is integrally formed on at least a part of the light-receiving surface for detecting a beam from the grating scale which is irradiated by the beam from the beam-emitting system. Information relating to displacement of the object is detected on the basis of the detection by the grating portion of the light-detecting element.

17 Claims, 26 Drawing Sheets

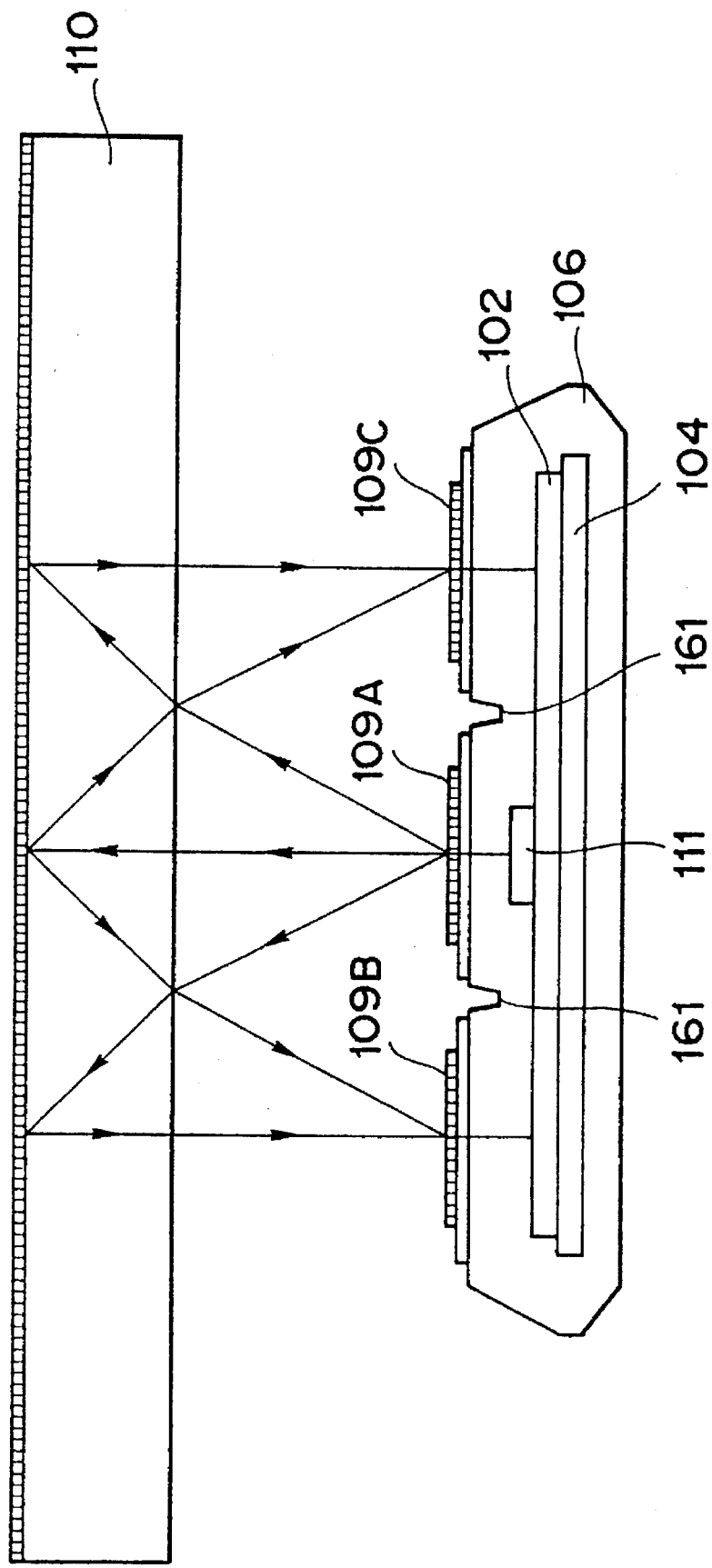

5,657,125

APPARATUS INCLUDING A LIGHT-DETECTING ELEMENT HAVING A PHOTO-ELECTRIC CONVERSION SURFACE AND AN INTEGRAL LIGHT BLOCKING MEMBER

This application is a continuation-in-part of application Ser. No. 08/082,541 filed Jun. 28, 1993, now abandoned.

BACKGROUND OF THE INVENTION

1. Field of the Invention

The present invention relates to a displacement information detection apparatus used in the field of machine tools, measuring apparatus, and the like in order to detect linear shifting and rotary shifting of an object; a detection device suitable therefor and a drive control apparatus using said displacement information detection apparatus.

2. Related Background Art

Recently, small-size, light-weight and high-performance linear encoders, rotary encoders, and so on which detect shifting of a moving object have become needed. Especially, when assembled in steppers, machine tools, various kinds of robots for manufacture, and so on, small-size, light-weight and highly precise encoders are desired.

FIG. 1 is a schematic view of the main portions of a typical encoder in the prior art. The encoder shown in the figure comprises two slit rows; a slit row provided in a main scale 64 and slit rows formed in a secondary scale 65.

In the same figure, a beam outgoing from a light-emitting element 61 is bent by a mirror 62, collimated by a lens 63 and incident on the main scale 64. The main scale 64 is a transparent material such as glass and the like or a thin metal plate, on which the slit row consisting of transmitting slit-shaped apertures of the same width and shielded portions is formed by means of etching, or the like.

The beams transmitted through the main scale 64 are incident on the secondary scale 65 in which the apertures have the same intervals as those of the apertures in the main scale 64. The beams transmitted through the apertures of the secondary scale 65 are received by a light receiving means 66.

The main scale 64 is fixed to the object to be measured (not shown), but is capable of relative motion, with respect to a detection head unit 60 indicated by dashed lines in FIG. 1, in the direction indicated by the arrow A.

Light or dark signals, due to the shutter effect by the apertures of the main scale 64 and those of the secondary scale 65, are generated on the surface of the light-receiving means 66 accompanying a motion of the main scale 64. The light receiving means 66 detects the light or dark signals, thereby measuring shifting states of the main scale 64, that is, shifting states of the object to be measured.

Though the conventional encoder shown in FIG. 1 is already small and is manufactured at a low cost, the number of components thereof is large, which limits the minituarization of the whole apparatus. Further, it is difficult to adjust the component position in assembling the encoder, which also limits the possible reduction in cost of the apparatus.

SUMMARY OF THE INVENTION

A primary object of the present invention is to provide a displacement information apparatus, a photo detection device and a drive control apparatus whose bodies are miniaturized and whose adjustment of the equipment thereof saves labour.

Other object of the present invention will be apparently understood from the following description of the embodiments of the present invention.

BRIEF DESCRIPTION OF THE DRAWINGS

FIG. 23 is a schematic cross-sectional view showing Embodiment 16.

DESCRIPTION OF THE PREFERRED EMBODIMENTS

In the embodiments described below, the encoder casts a beam from a light-emitting element on a scale on which slit-shaped apertures are periodically formed. The beams transmitted through the apertures of said scale are received by a light-receiving means which has apertures on at least one light receiving surface, wherein the intervals of the apertures are the same as those of the apertures of the scale. Information of relative shifting between the scale and the light-receiving means is detected on the basis of the output signal from the light-receiving means.

More specifically, the light-receiving means has a plurality of separate light-receiving elements on a common base member, and apertures are integrally formed at least on a part of the light-receiving surfaces of the plurality of the light-receiving elements. The intervals of the apertures are the same as those of the apertures of the above-mentioned scale and phases of the apertures of respective light-receiving elements shift from each other in the direction in which the scale moves. Or, the light-receiving means has a plurality of separate light-receiving elements on a common base member, and some of the light-receiving elements have apertures integrally formed on the light-receiving surfaces at the same intervals as those of the apertures of the scale. The signals from the light-receiving elements having apertures are used to detect information of relative shifting between the scale and the light-receiving means while signals from the light-receiving elements without appertures are used as reference signals.

Further, in one of the encoders of the following embodiments, a coherent beam is incident on a first diffraction grating and the diffracted light from the first diffraction grating is incident on a second diffraction grating formed on the scale. Two beams of diffracted light of predetermined orders from the second diffraction grating are conducted to from an interference fringe on the light-receiving surfaces of light-receiving elements opposed to the scale, wherein slit-shaped apertures are integrally formed on the light-receiving surfaces of the light-receiving elements at the same intervals as those of the interference fringe and information of relative shifting between the scale and the light-receiving elements is detected on the basis of the output signals from the light-receiving elements.

Figure 1:
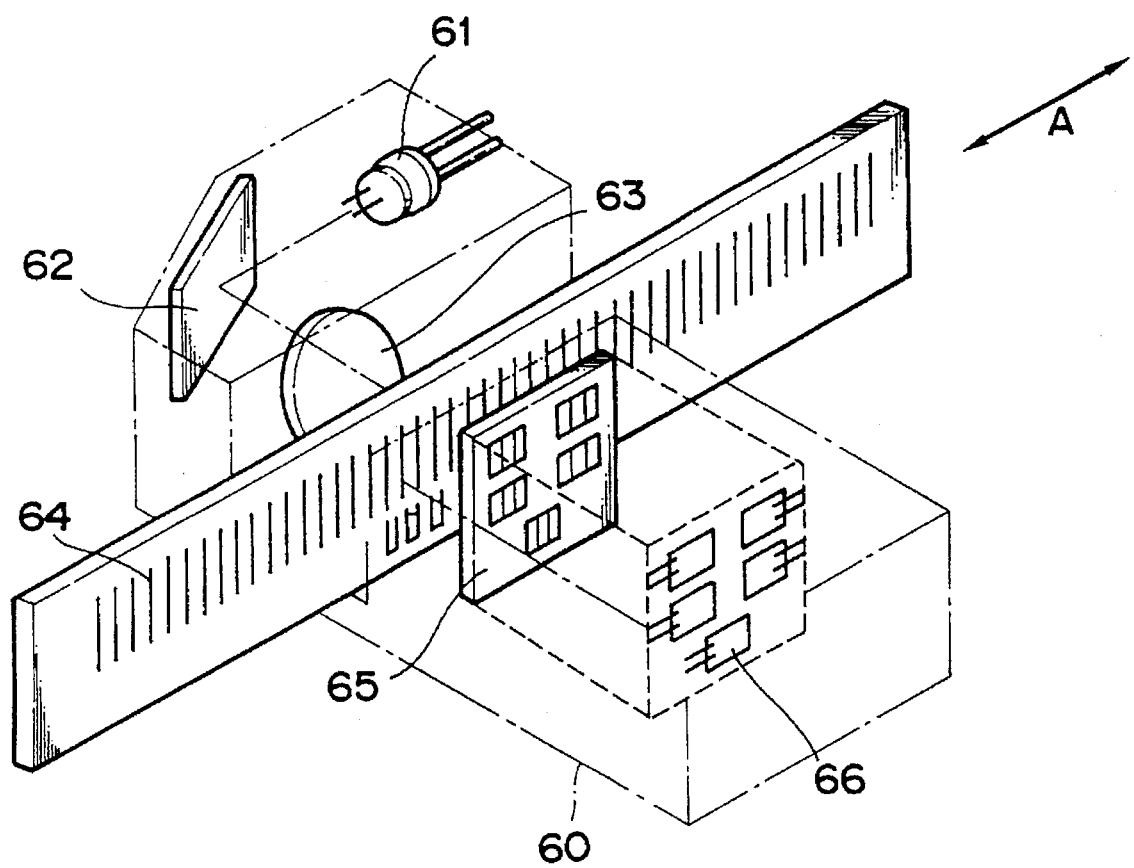
FIG. 1 is a schematic view of the main portions of a conventional linear encoder.
Figure 2:
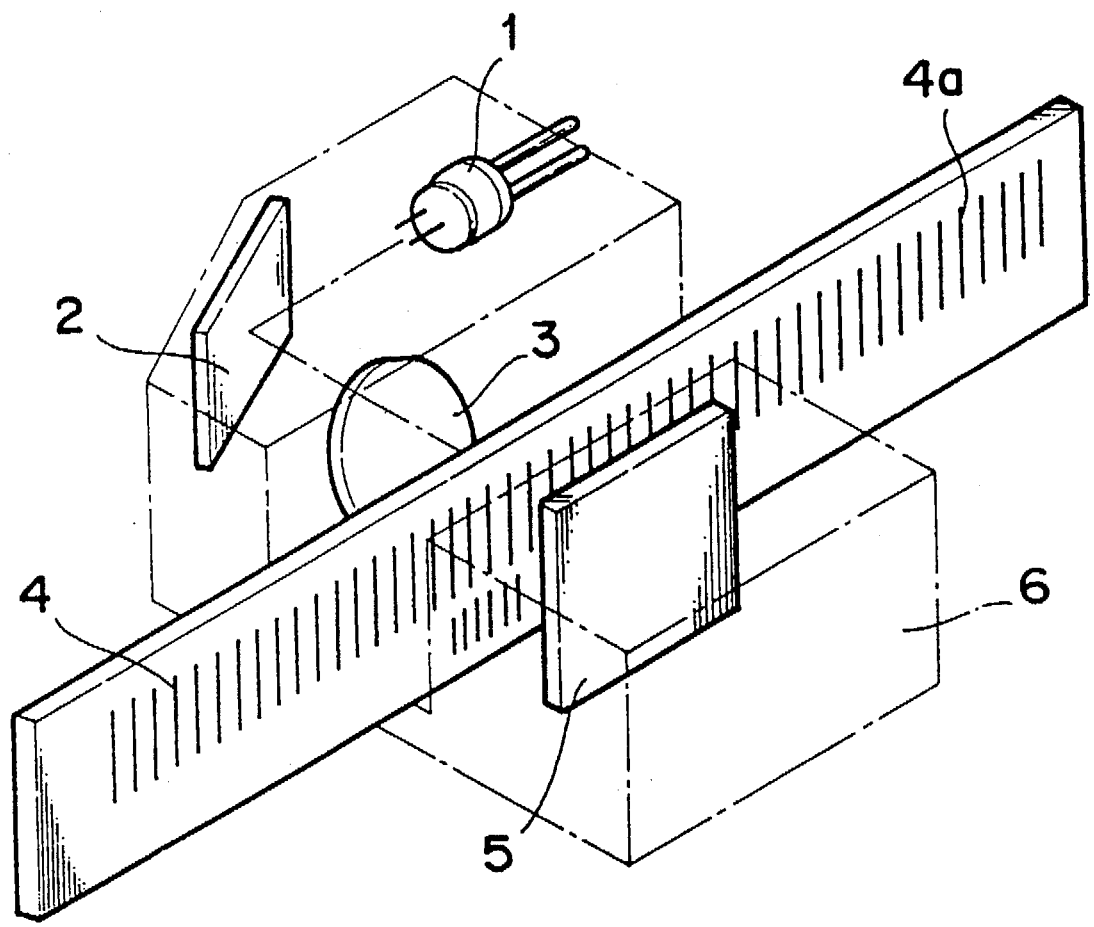
FIG. 2 is a schematic view of the main portions of an encoder of Embodiment 1 according to the present invention.
Figure 3:
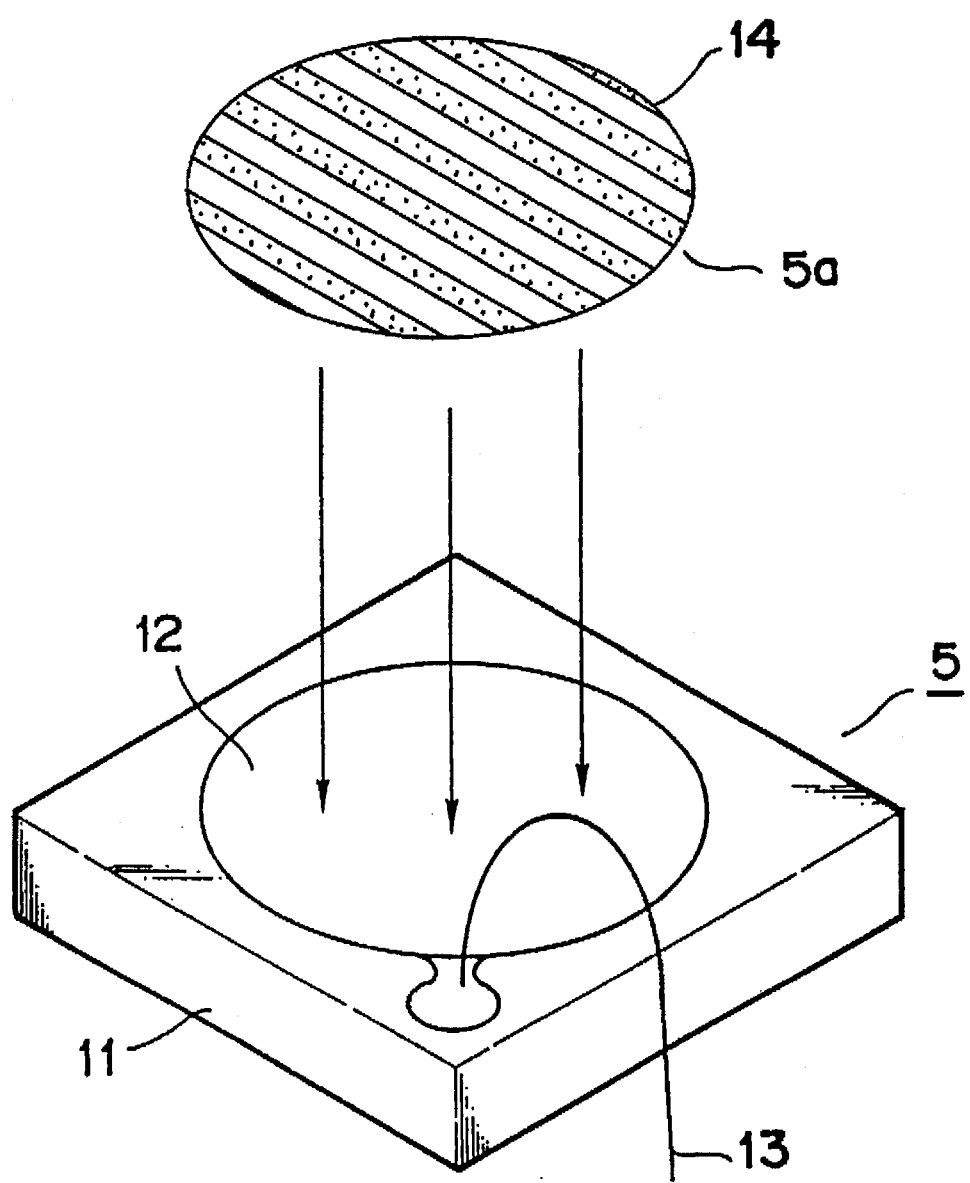
FIG. 3 is a schematic view of the main portions of the light-receiving means shown in FIG. 1.

FIG. 2 is a schematic view of the main portions of an encoder of Embodiment 1 according to the present invention, and FIG. 3 is a schematic view of a light-receiving means in the apparatus shown in FIG. 1.

In the figure, reference numeral 1 denotes a light-emitting element such as an LED, and the like, and reference numeral 2 denotes a mirror, which reflects and deflects a beam emitted from the light-emitting element 1. A lens (collimator lens) 3 collimates the beam deflected by the mirror 2 and casts it on a scale 4. The scale 4 is a transparent base material or a thin metal plate having a slit row 4a which serves as a grating, where transparent slit-shaped apertures and shielded portions are periodically formed by means of etching, or the like. The scale 4 is fixed to an object to be measured (not shown).

Reference numeral 5 denotes a light-receiving means. As shown in FIG. 3, the light-receiving means 5 has a light-receiving element 12 on a base member 11 and an electrode 13 attached to the light-receiving element 12. A slit row 5a serving as a grating unit is formed on the surface of the light-receiving element 12. The slit row 5a may be formed by, besides etching, the photo-lithography method using a semiconductor exposure apparatus, for example.

In this embodiment, the beam emitted from the light-emitting element 1 is bent by the mirror 2, collimated by the lens 3 and cast on the scale 4. Of the beam cast on the scale 4, beams which pass through the apertures of the slit row 4a and those of the slit row 5a of the light-receiving means 5 are received by the light-receiving element 12. When the scale 4 moves together with the object to be measured (not shown), the passing beams are modulated due to the shutter effect of the apertures of the slit row 4a of the scale 4 and those of the slit row 5a of the light-receiving means 5. The modulated beams are received by the light-receiving element 12, thereby obtaining shifting information such as a shifting amount of the scale 4, (that is, of the measured object), and the like on the basis of the signals from the light-receiving element 12 by the well-known methods.

In this embodiment, by forming the slit row 5a on the surface of the light-receiving element 12, the secondary scale 65 and the light-receiving means 66, which are two separate components in the conventional example shown in FIG. 1, are assembled as one component, thereby miniaturizing the whole body of the encoder.

Further, while some mechanically holding mechanism is required when the slit rows and the light-receiving elements are assembled in the conventional encoder, they are constructed as one component in this embodiment and positioning between the slit row and the light-receiving element is not necessary, thereby facilitating the assembly and reducing cost.

Figure 4:
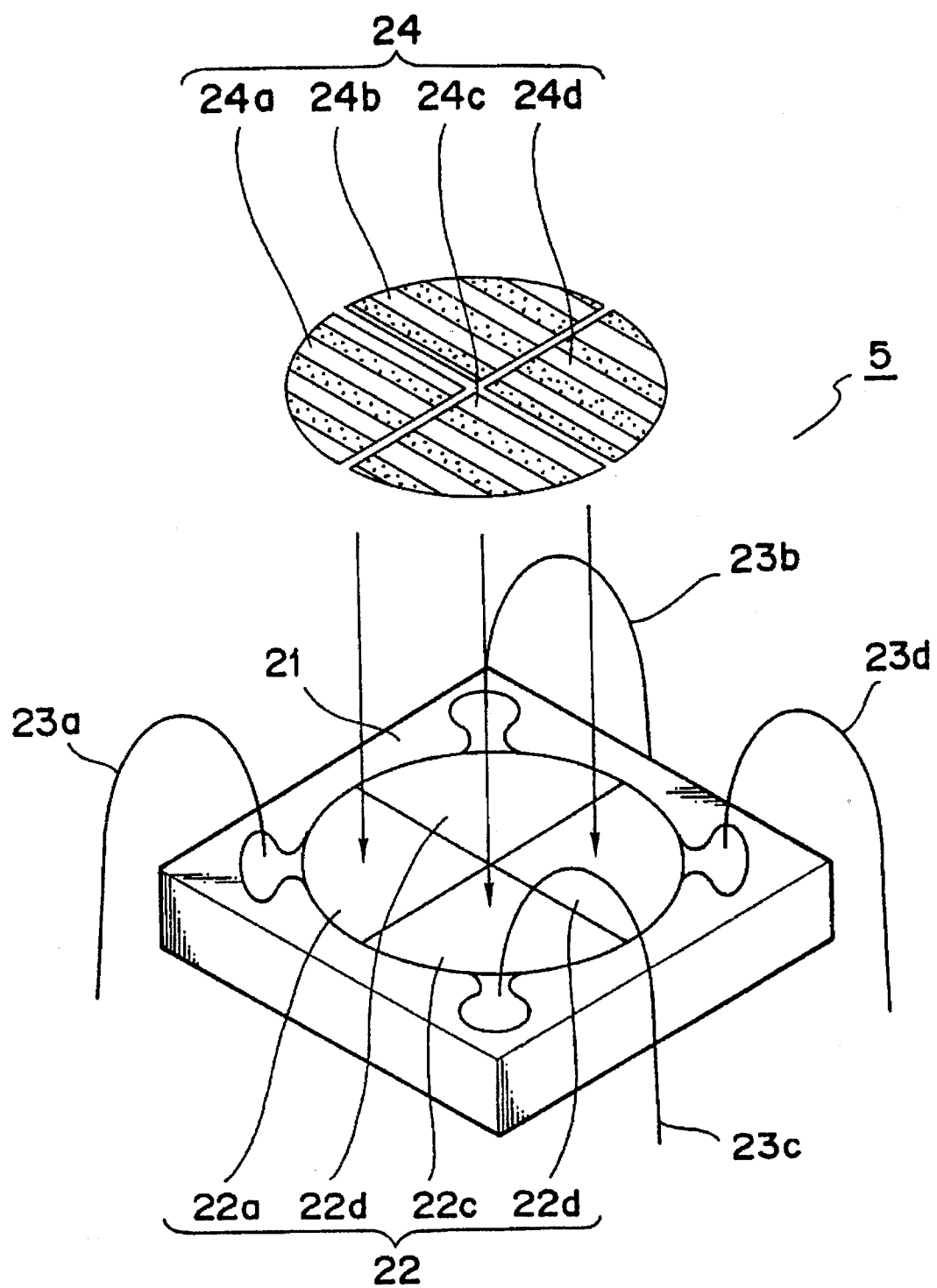
FIG. 4 is a schematic view of the main portions of a light-receiving device in an encoder of Embodiment 2 according to the present invention.

FIG. 4 is a schematic view showing the main portions of a light-receiving means 5 in the encoder of Embodiment 2 according to the present invention. This embodiment has a construction which is similar to that of Embodiment 1 shown in FIG. 2 except that the light-receiving surface of a light-receiving element 22 is divided into four areas 22a to 22d and that slit row gratings 24a to 24d having different phases from one another are provided respectively on the areas.

In the figure, reference numeral 21 denotes a base plate, and light-receiving elements 22a, 22b, 22c and 22d receive beams and convert them into electrical signals. Electrodes 23a, 23b, 23c and 23d respectively attached to the light-receiving elements 22a to 22d take out signals. Slit rows 24a, 24b, 24c and 24d provided respectively on the surfaces of the light-receiving elements 22a to 22d consist of apertures having the same intervals as those of the apertures of the slit row 4a of the scale 4.

In this embodiment, electrodes 23a to 23d are formed respectively on separate light-receiving elements 22a to 22d on the base plate 21. Slit rows 24a to 24d are formed on the surfaces of the light-receiving elements 22a to 22d. Note that the slit rows 24a to 24d may be formed by photo-lithography. These slit rows 24a to 24d are arranged so that their phases shift from one another in the direction in which the scale 4 moves.

In this embodiment, a plurality of signals having different phases from one another are obtained from the light-receiving elements 22a to 22d, and shifting information such as the shifting amount, the shifting direction, and the like of the measured object is obtained on the basis of the signals by means of well-known methods. Further, in this embodiment, one light-receiving element is divided into a plurality of light-receiving elements which output signals having different phases from one another. Accordingly, even when the number of signals further increases, only one mechanism is required to mechanically hold the light-receiving elements thereby easily minimizing size of the unit, miniaturizing the apparatus and reducing the cost thereof.

Figure 5:
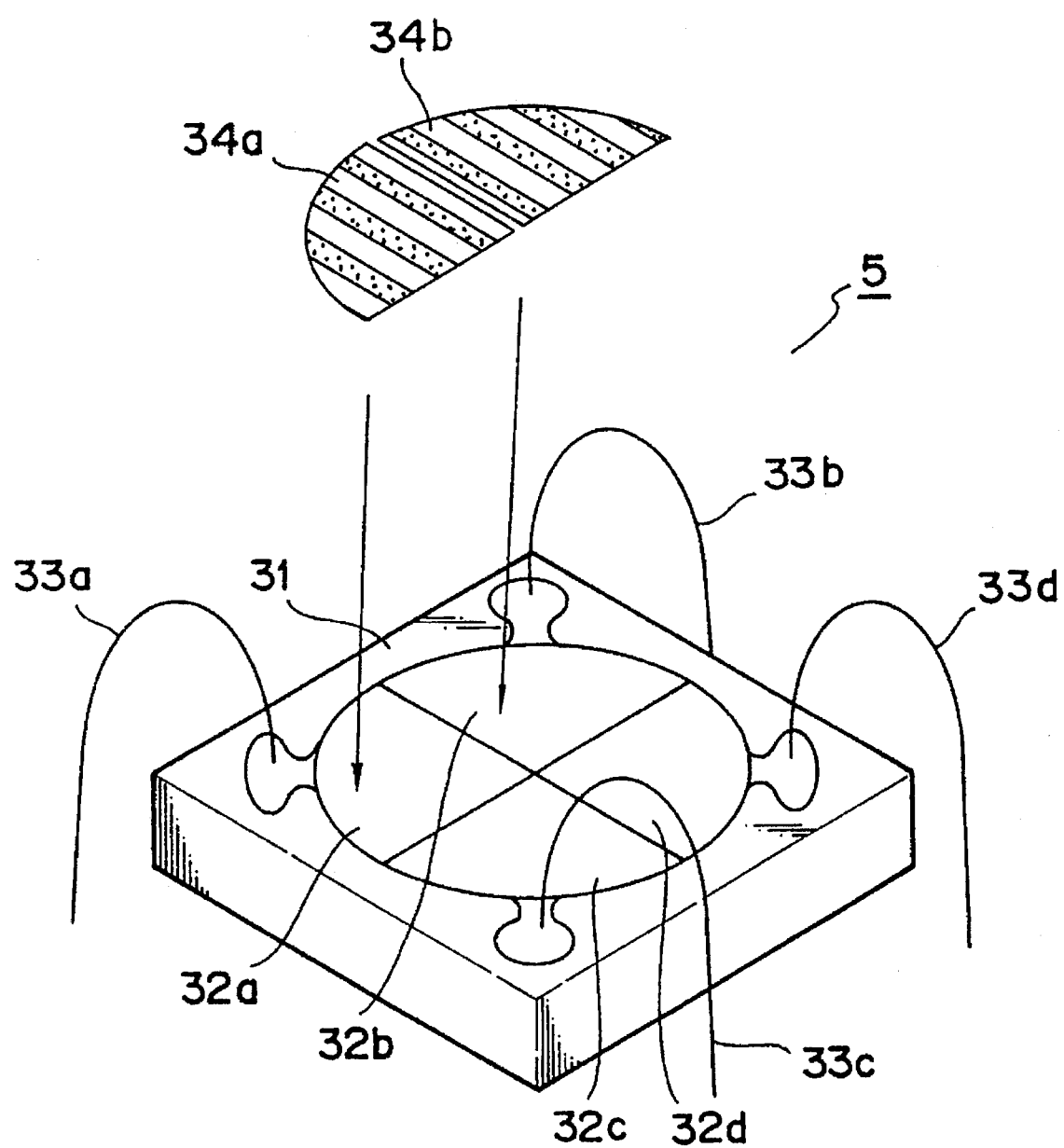
FIG. 5 is a schematic view of the main portions of a light-receiving device in an encoder of Embodiment 3 according to the present invention.

FIG. 5 is a schematic view showing the main portions of a light-receiving means 5 in the encoder of Embodiment 3 according to the present invention. This embodiment has a construction which is similar to that of the above-mentioned Embodiment 2 except that some of the plurally divided light-receiving elements are utilized to obtain reference signals.

In the figure, reference numeral 31 denotes a base member, and light-receiving elements 32, 32b, 32c and 32d receive beams and convert them into electrical signals. Electrodes 33a, 33b, 33c and 33d attached respectively to the light-receiving elements 32a to 32d take out electrical signals. Slit rows 34a and 34b provided on the surfaces of the light-receiving elements consist of apertures having the same intervals at those of the slit row 4a of the scale 4.

The light-receiving means of this embodiment is provided with separate light-receiving elements 32a to 32d on the base plate 31 and the electrodes 33a to 33d attached to respective light-receiving elements. Slit rows 34a and 34b are formed on the light-receiving elements 32a and 32b. Note that the slit rows 34a and 34b may be formed on the light-receiving elements by photo-lithography. These slit rows 34a and 34b are arranged so that their phases shift from each other in the direction in which the scale 4 moves, and signals having different phases are output from the light-receiving elements 34a and 34b. Light-receiving elements 32c and 32d are serially connected with electrodes, thereby obtaining reference signals.

In this embodiment, the light-receiving means 5 shown in FIG. 5 serves as the light-receiving means 1 shown in FIG. 2. The beam emitted from the light-emitting element 1 and bent by the mirror 2 is collimated by the lens 3, transmitted through the apertures of the slit row 4a formed on the scale 4 and received by the light-receiving means 5. During the process, the light-receiving elements 32c and 32d monitor, as reference signals, a change in the amount of light received by the light-receiving means 5 due to a change in (first and second occurences) output of the light-emitting element 1, change in transmissibility caused by the shift of the scale 4, and the like. Accordingly, stable information of movement without offset is obtained, for example, by correcting the electrical signals from the light-receiving elements 32a and 32b so as to compensate for the change in the amount of light on the basis of the reference signals.

Furthermore, the light-receiving means of this embodiment can further improve resolving power by electrically dividing the direct signal. Thus, this embodiment realizes not only a small-size, inexpensive apparatus but also an encoder capable of measuring information of movement with precision regardless of change in the amount of light.

Figure 6:
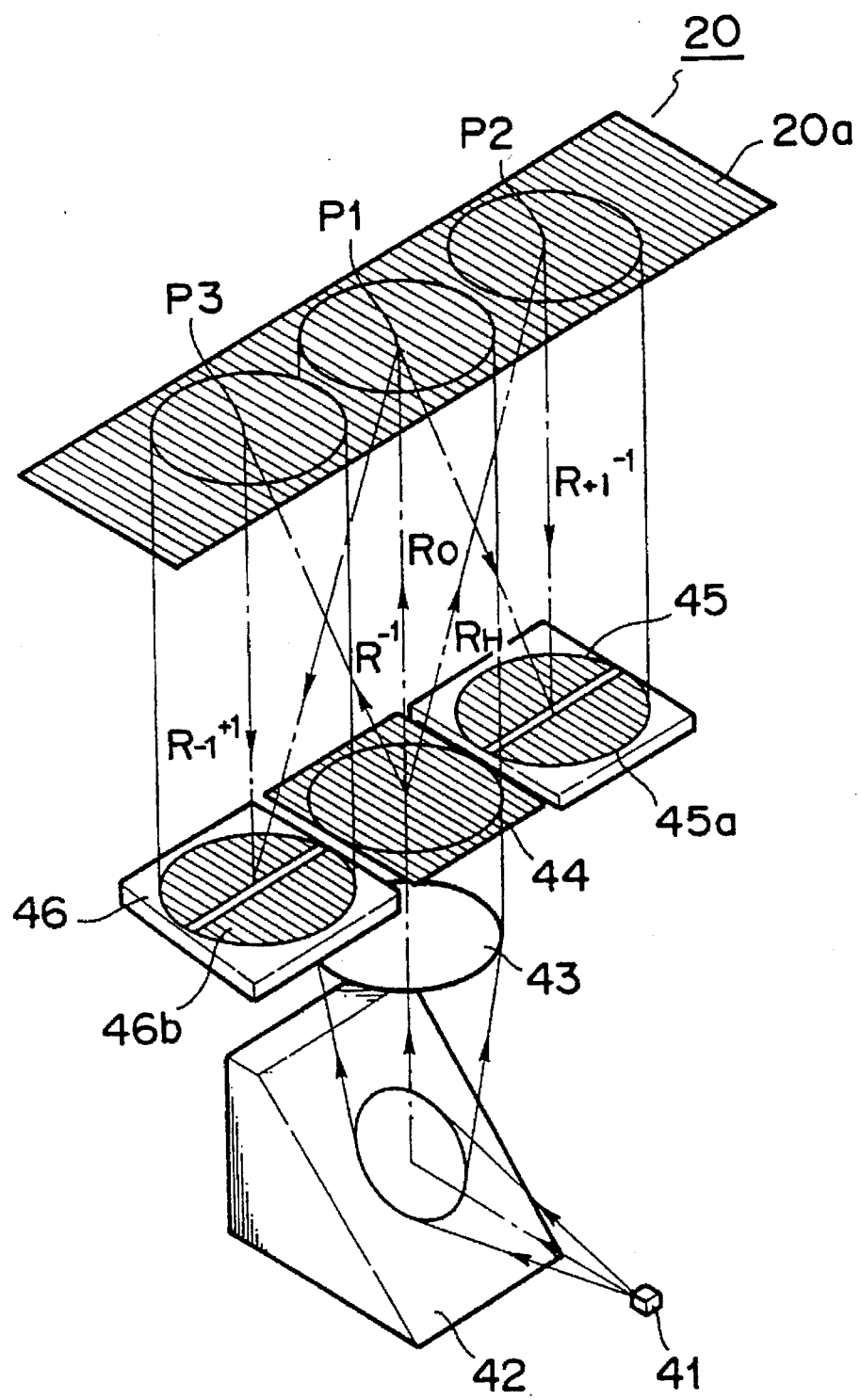
FIG. 6 is a schematic view of the main portions of a light-receiving device in an encoder of Embodiment 4 according to the present invention.

FIG. 6 is a schematic view showing the main portions of Embodiment 4 in which the present invention is applied to an encoder of interference type. In the figure, a light-emitting element 41 emits a coherent beam. Reference numeral 42 denotes a reflecting element, and a lens 43 collimates the beam from the light-emitting element 41. A diffraction grating (first diffraction grating) 44 diffracts the beam transmitted through the lens 43. On the surface of a scale 20, a diffraction grating (second diffraction grating) 20a is formed, which is fixed to the object to be measured (not shown). The diffraction grating 20a of the scale 20 and the diffraction grating 44 are arranged to be opposite from each other. Light-receiving means 45 and 46 are provided with respectively slit rows 45a and 46b, which are integrally formed on respective surfaces of the light-receiving elements.

The divergent beam emitted from the light-emitting element 41 provided horizontally in an container (not shown) has its course bent by the reflecting element 42, is transmitted through and diffracted by the diffraction grating 44 formed on the rear side of a glass plate of a window, and is divided and emitted as the 0th-order diffracted light $R_0$, the (+) 1st-order diffracted light $R_{+1}$, the (−) 1st-order diffracted light $R_{-1}$, and so on.

The beam $R_0$ rectilinearly advancing through the diffraction grating 44 is reflected and diffracted at a point P1 on the diffraction grating 20a formed on the scale 20 to be divided the (+) 1st-order diffracted light $R_0^{+1}$, the (−) 1st-order diffracted light $R_0^{-1}$, and so on. The (+) 1st-order deffracted light $R_{+1}$ and the (−) 1st-order diffracted light $R_{-1}$, which are diffracted by the diffraction grating 44, are reflected and diffracted respectively at points P2 and P3 on the diffraction grating, and the (−) 1st-order diffracted light $R_{+1}^{-1}$ obtained from the beam $R_{+1}$ and the (+) 1st-order diffracted light $R_{-1}^{+1}$ obtained from the beam $R_{-1}$ are respectively interfered with the beam $R_0^{+1}$ on the light-receiving means 45 and the beam $R_0^{-1}$ on the light-receiving means 46. When the pitch of the slit rows 45a and 46b formed on the light-receiving means 45 and 46 is the same as the pitch of the interference fringe, the light-receiving means 45 and 46 generates signals which are expressed as:

$$\sin(4\pi X/P)$$

wherein P: the pitch of the interference fringe, and X: the shifting amount. In this way, information of movement such as the shifting amount and the like is obtained.

Generally, the number of components of the encoder of interference type is large, and the positional precision of each component is very strict, where positioning must be done in the order of micrometers. Accordingly, quantity production is difficult and the cost is hard to reduce.

On the other hand, the encoder of the embodiment (1-a) can be miniaturized because a light-receiving element having a diameter larger than that of the beam spares the lens and the number of the components is reduced by forming the slit row integrally with the light-receiving element.

The encoder of the embodiment (1-b) can realize quantity production because the problem of precise positioning of the light-receiving elements and the slit rows, which makes it difficult to perform positioning in prior art, can be avoided.

The encoder of the embodiment (1-c) can facilitate design of the optical system because signals of desired phases can be obtained by forming the slit rows 45a and 46b so that their phases shift from each other. Also, it is easy to realize a stable encoder which is formidable against non-uniformity in reflectance of the scale, or the like by providing separate light-receiving elements on which beams transmitted through different areas of the slit row are respectively incident, wherein signals having four different phases are output.

The encoder of the embodiment (1-d) can prevent the beams returning from the surfaces of the diffraction gratings from being incident on the light-receiving elements because the light path for advancing light and the light path for returning light are separated from each other and division of the beams and synthesis thereof are performed at different positions of the diffraction grating.

The encoder of the embodiment (1-e) can be easily miniaturized and thinned because the light path for advancing light and the light path for returning light are separated from each other so that a short-focus micro-lens can be formed and that the distance between the light-emitting element and the lens can be reduced.

The encoder of the embodiment (1-f) can be easily miniaturized because the beam from the light-emitting element has its course bent by the reflecting element so as to obtain a sufficient distance between the lens and the light-emitting element, as long as a desired focal distance, even if the glass plate to which the lens is fixed is located close to the light-emitting element.

The encoder of the embodiment (1-g) can have not only a small size but also high precision and high resolving power because the pitch of the diffraction grating on the scale is fine enough to spatially separate the beams of diffracted light from each other in order to facilitate miniaturization.

In the following embodiments, the light-receiving element generates electrical signals corresponding to the beams incident on the light-receiving portion(s), and is provided with the grating pattern(s) integrally formed on said light-receiving portion(s) by the lithography technique.

Also, in the following embodiments, the displacement detection apparatus detects relative displacement of the object to be measured with respect to the light-receiving element on the basis of change in the phase of the stripes (fringe) formed by the beam from the measured object. The light-receiving element is provided with the light-receiving portion(s) having a grating pattern wherein output signals are applied to the light-receiving portion(s) in response to the beams which form said stripes (fringe) on the light-receiving portion(s) and the grating pattern is integrally formed on the light-receiving element.

Preferred embodiments of the present invention may include grating patterns: which are made of resist material; which are wiring patterns; which are formed on a transparent layer covering a semiconductor layer; which are formed by at least one of the P layer and the N layer of a semiconductor layer; and the like. Each of the above grating patterns can be formed by lithography technique, which will be disclosed in the following embodiments.

Figure 7A:
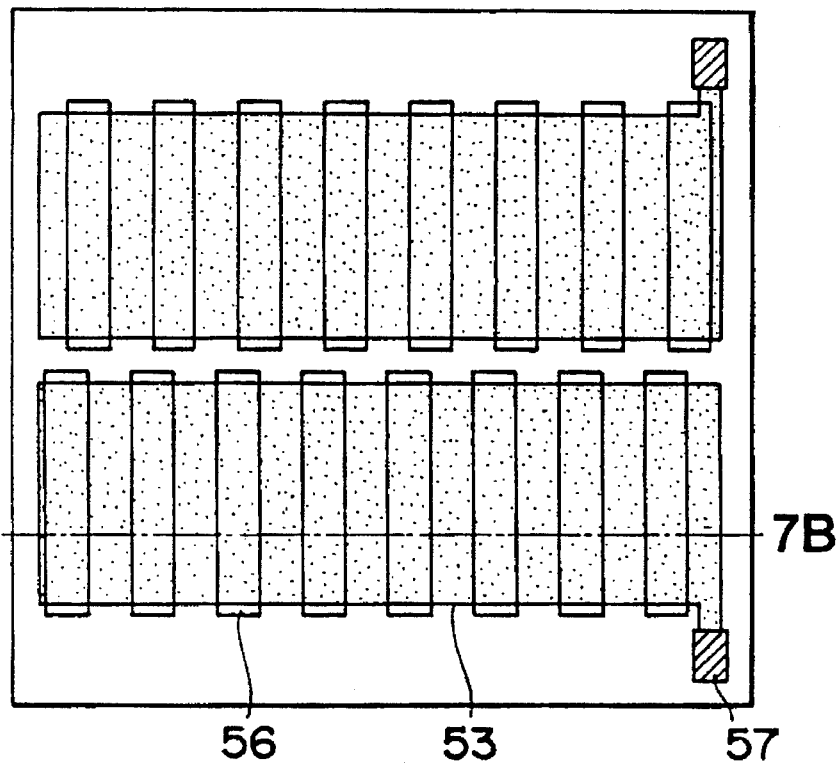
FIGS. 7A and 7B are schematic views showing a light-receiving device of Embodiment 5 according to the present invention.
Figure 7B:
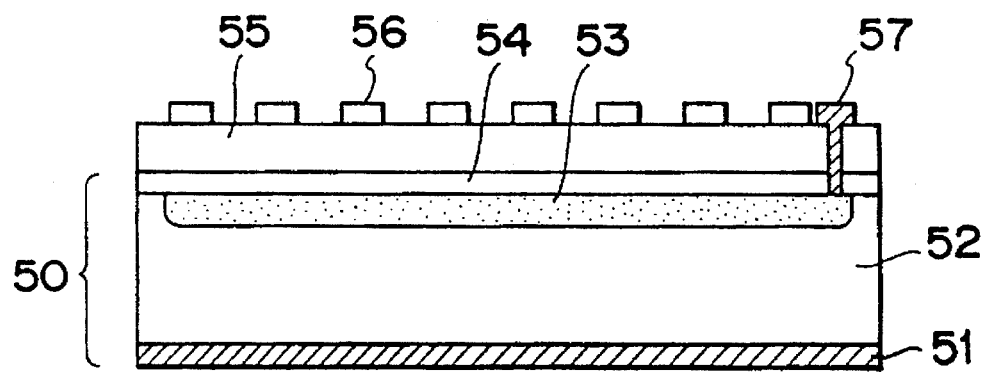

FIGS. 7A and 7B are schematic views showing the light-receiving element of Embodiment 5 according to the present invention. FIG. 7B shows cross-sections a–a' and b–b' indicated in the top view FIG. 7A in one view. In FIG. 7B, the portion indicated by reference numeral 50 has the same construction as a typical silicon photodiode, and an N layer 52 and a P layer are subsequently laminated on a cathode electrode 51 at the bottom of the portion 50 to form a PN junction. Further, as $SiO_2$ film 54 for protection is formed on the P layer 53.

In this embodiment, a film 55 made of transmitting material such as $SiO_2$, or the like is further formed on the $SiO_2$ film 54 by, for example, the film forming techniques such as spin-coat, and so on. The transmitting (material) film 55 is coated with a photo-resist. Subsequently, the film is exposed, via a mask on which the grating patterns are drawn, to light; otherwise, the grating patterns are drawn with an electric beam or a laser beam, and then exposure is performed. Only unnecessary portions of the resist are removed by etching with hydrogen fluoride, and the like so that the remaining resist forms the gratings 56 (diffraction gratings) on the transmitting film 55. On the other hand, part of the $SiO_2$ film 54 covering the P layer is removed by photo-etching in order to form anode electrodes 57 of aluminum, or the like. As shown in the top view, two anode electrodes corresponding to two channels are formed, thereby providing the light-receiving portions so that a pair of signals having different phases from each other can be output from the elements by forming a pair of gratings, whose phases shift from each other, on the corresponding light-receiving portions.

In this embodiment, the grating patterns are integrally formed on the light-receiving portions of the light-receiving element to realize a simple, small-size light-receiving element.

By employing the above-mentioned semiconductor device manufacturing processes, the light-receiving portions and the grating patterns can be easily constructed integrally, thereby restricting the positional relation between the gratings 56 and the light-receiving portions (or light-receiving element) with very high precision.

Furthermore, by using the above-mentioned light-receiving element, the assembly processes of a displacement sensor can be facilitated, and the displacement sensor can be miniaturized.

In order to ensure the function of the gratings 56 as the diffraction gratings, the distance between the gratings 56 and the P layer 53, that is, the light-receiving surfaces must be sufficiently greater than the wavelength (operating wavelength) of light incident on the light-receiving element. Incidentally, the cross-sectional shape of the gratings 56 is not limited to rectangular shapes, but may be formed in any optimal shape (for example, blaze, and so on) according to the optical designing.

Though the light-receiving element in this embodiment has the transmitting film 55 on which the gratings 56 are formed, the gratings may be formed immediately, without forming the transmitting film 55, over the $SiO_2$ film 54.

The gratings 56 of the above-mentioned light-receiving element are made of the photo-resist. The present invention, however, is not limited thereto.

Figure 8A:
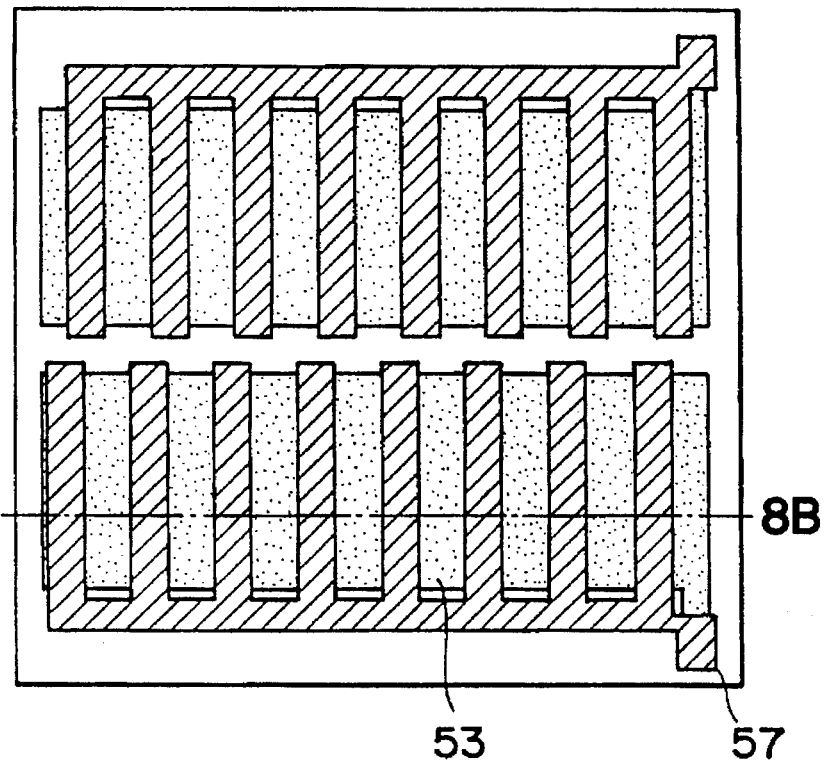
FIGS. 8A and 8B are schematic views showing a light-receiving device of Embodiment 6 according to the present invention.
Figure 8B:
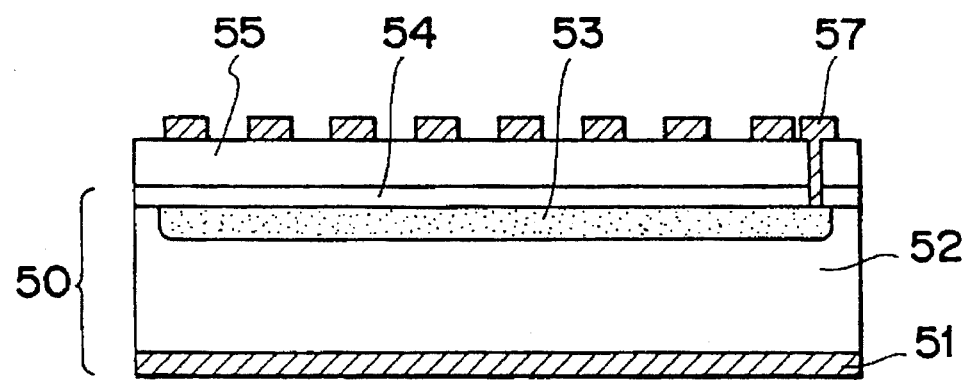

FIGS. 8A and 8B are schematic views showing the light-receiving element of Embodiment 6 according to the present invention. As shown in these figures, (diffraction) gratings are formed as aluminum wiring patterns which also function as anode electrodes 57. As shown in FIG. 8B, the aluminum wirings may be connected with the anode electrodes 53, otherwise, they may be separated from the anode electrodes 53, but connected externally with the cathode electrode, the circuit ground, or the like.

Figure 9A:
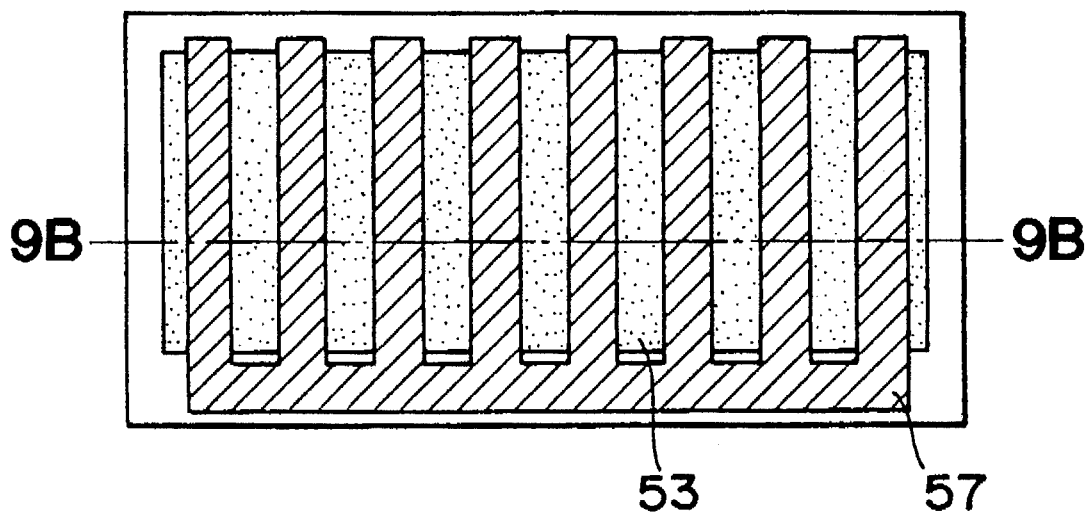
FIGS. 9A and 9B are schematic view showing a light-receiving device of Embodiment 7 according to the present invention.
Figure 9B:
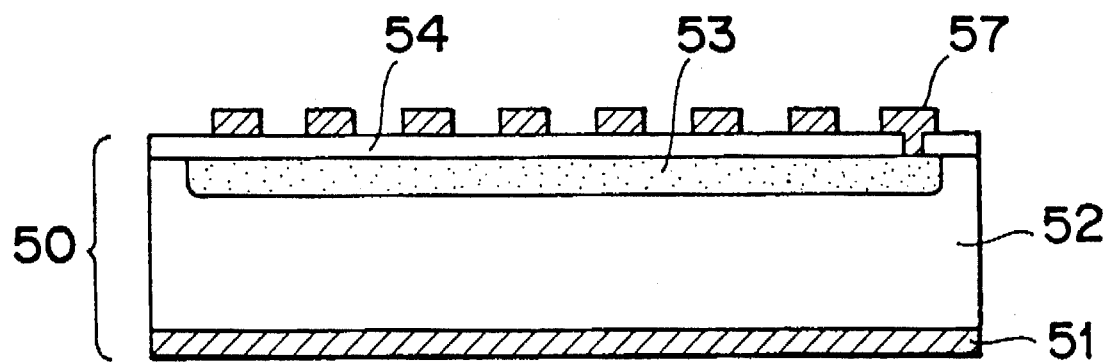

FIGS. 9A and 9B are schematic views showing the light-receiving element of Embodiment 7 according to the present invention, which is provided with only one pair of the grating and the light-receiving portion. In FIGS. 9A and 9B, a portion 50 is a typical silicon photodiode which is the same as those of the embodiments shown in FIGS. 7A to 8B. This light-receiving element dispenses with the transmitting film 55 of the element shown in FIGS. 8A and 8B, and has a (diffraction) grating which is formed as an aluminum wiring pattern functioning as an anode electrode 57 immediately formed over the $SiO_2$ film 54.

Figure 10A:
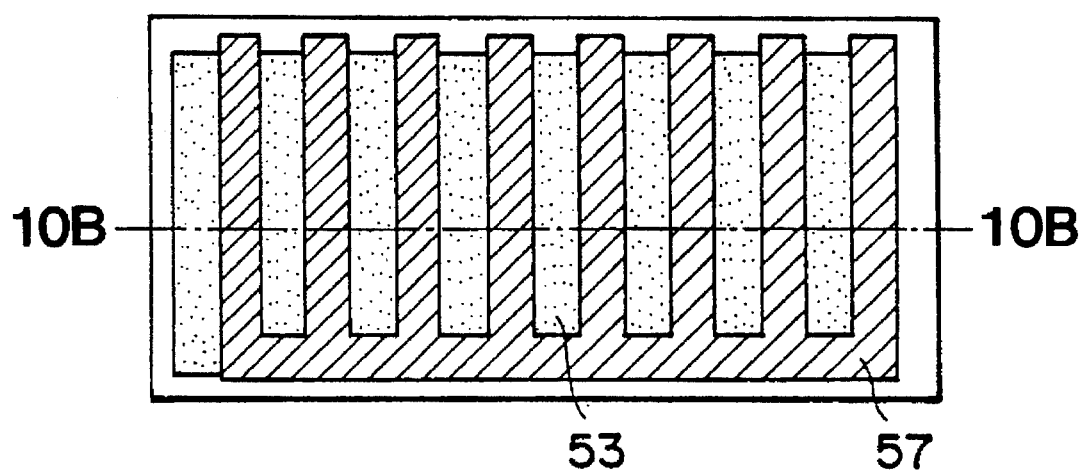
FIGS. 10A and 10B are schematic views showing a light-receiving device of Embodiment 8 according to the present invention.
Figure 10B:
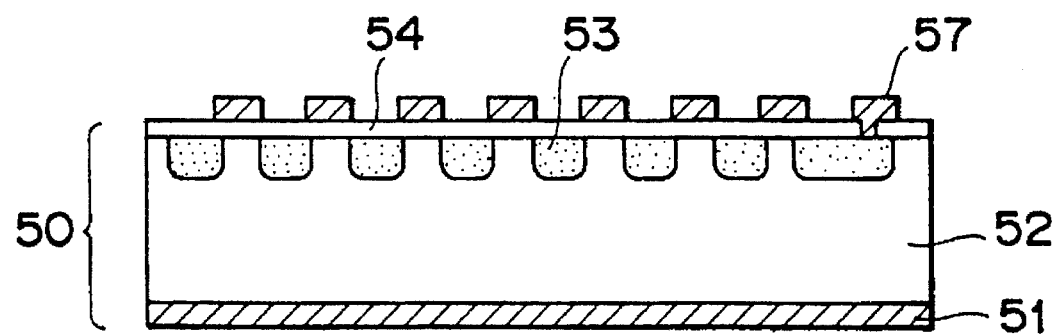

FIGS. 10A and 10B are schematic views showing the light-receiving element of Embodiment 8 according to the present invention, which is also provided with only one pair of the grating and the light-receiving portion. In this light-receiving element, the shape of the P layer is different from that of the P layer of the embodiment shown in FIGS. 9A and 9B, wherein the P layer is not formed on the portions shielded with the aluminum wiring constituting the grating, that is, the P layer is formed in the shape of a grating so as to reduce capacitance of the PN junction and increase the speed of response of the element.

Figure 11A:
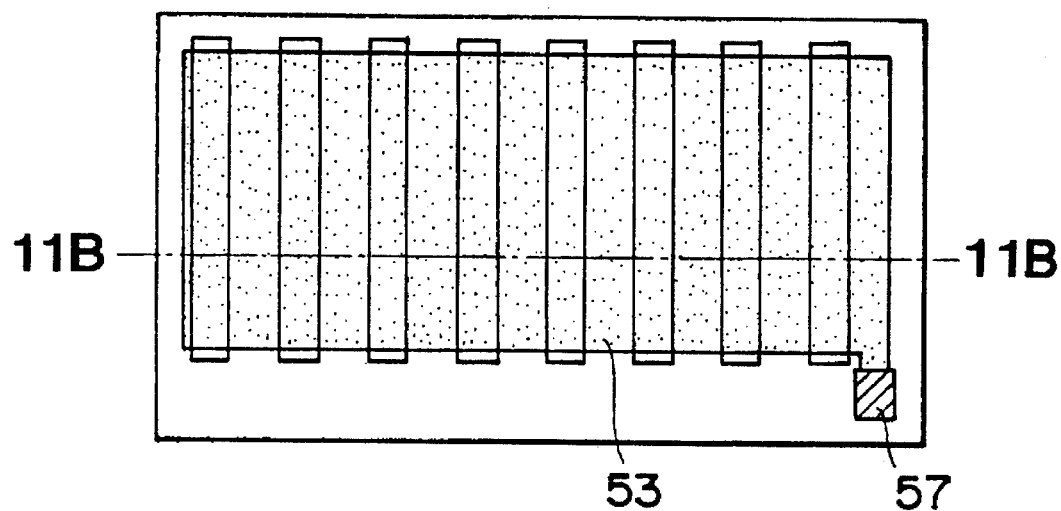
FIGS. 11A and 11B are schematic views showing a light-receiving device of Embodiment 9 according to the present invention.
Figure 11B:
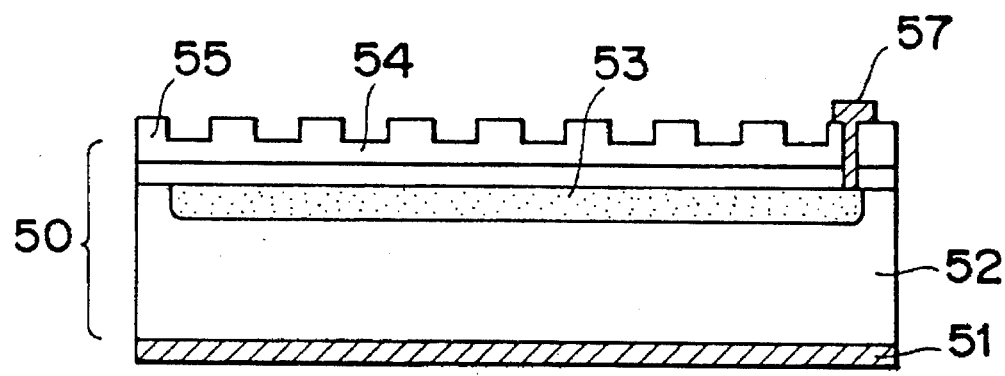

FIGS. 11A and 11B are schematic views showing the light-receiving element of Embodiment 9 according to the present invention, which is also provided with only one pair of the grating and the light-receiving portion. In FIGS. 11A and 11B, a portion 50 is a typical silicon photodiode as in Embodiments 7 and 8. In this light-receiving element, an SiO$_2$ film serving as the transmitting film 55 is formed, by the spin-coat method, on the SiO$_2$ film 54 on the portion 50 which functions as a typical silicon photodiode, and the phase (diffraction) grating is formed by removing part of the transmitting film 55 by photo-etching.

Figure 12A:
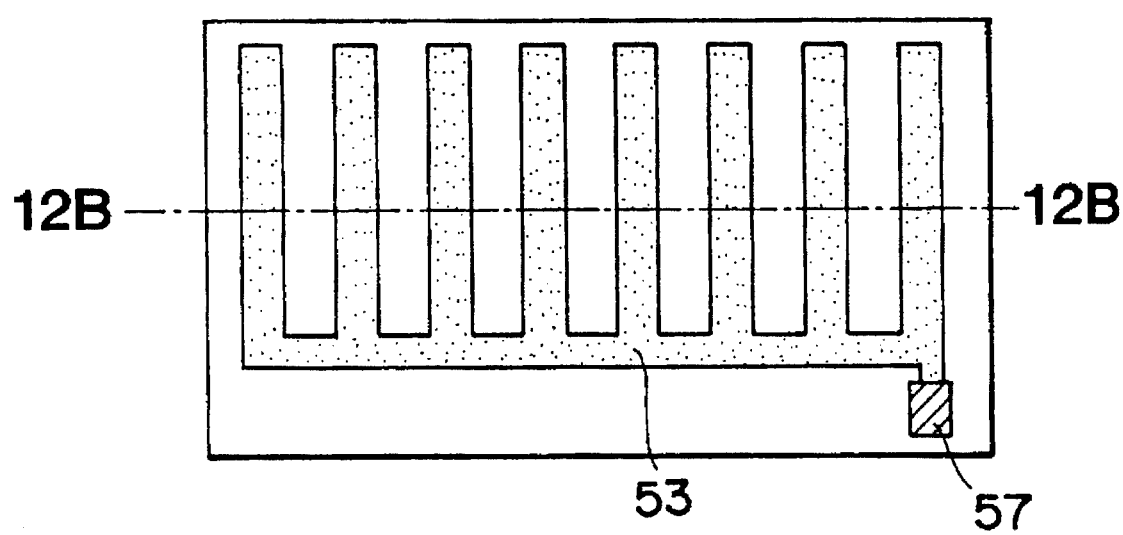
FIGS. 12A and 12B are schematic views showing a light receiving device of Embodiment 10 according to the present invention.
Figure 12B:
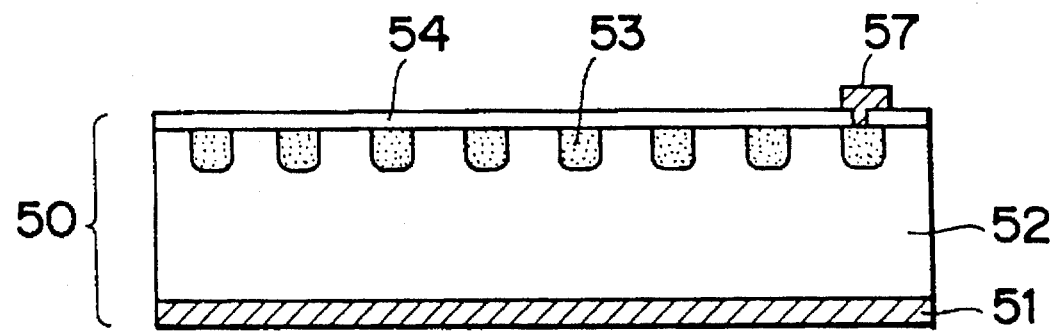

FIGS. 12A and 12B are schematic views showing the light-receiving element of Embodiment 10 according to the present invention, which is also provided with only one pair of the grating and the light-receiving portion. In FIGS. 12A and 12B, the same members as those in FIGS. 1 and 2 are indicated by the same reference numerals. In this light-receiving element, the P layer 53 itself, which is the light-receiving portion of the portion 50 serving as a typical silicon photodiode, is formed in the shape of a grating.

Figure 13A:
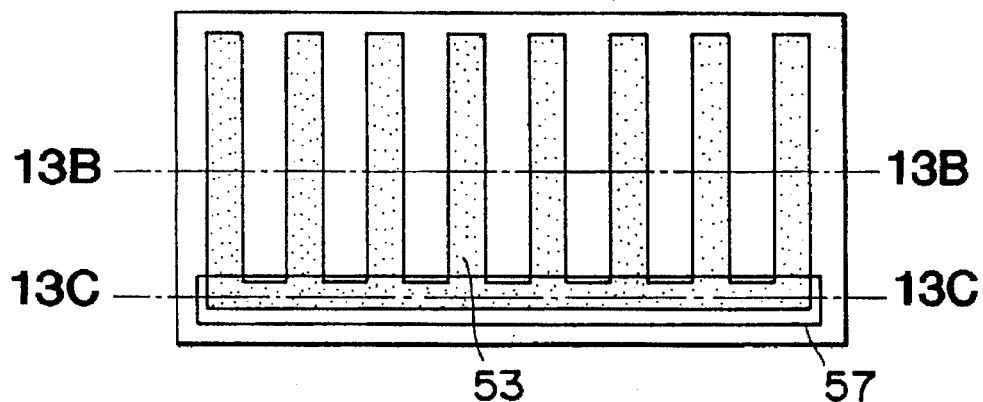
FIGS. 13A to 13C are schematic views showing a light-receiving device of Embodiment 11 according to the present invention.
Figure 13B:
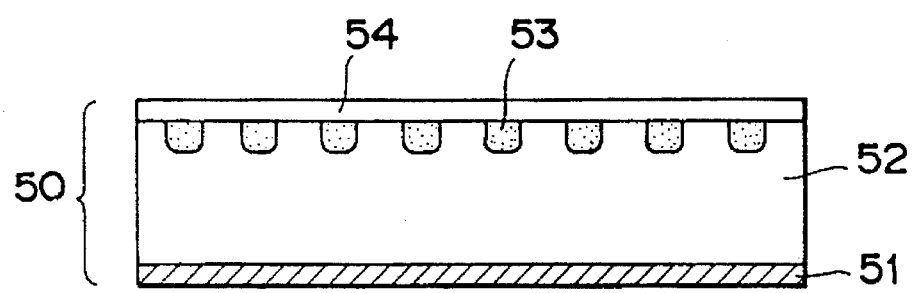
Figure 13C:
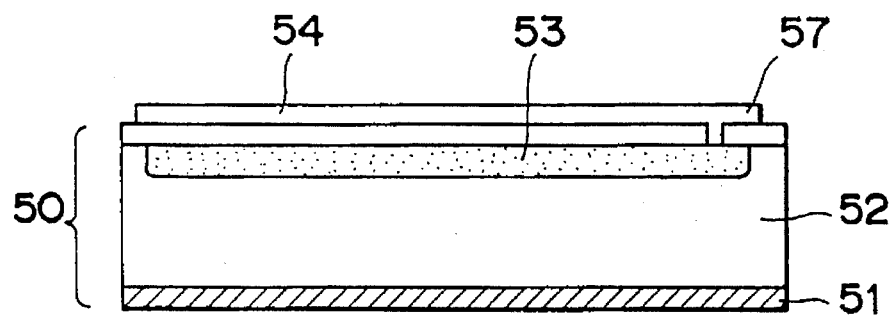

FIGS. 13A, 13B and 13C are schematic views showing the light-receiving element of Embodiment 11 according to the present invention, which is also provided with only one pair of the grating and the light-receiving portion. In Order to be easily understood, an anode electrode 57 (including an aluminum wiring portion) is shown as transparent, only in these FIGS. 13A to 13C. FIG. 13B and FIG. 13C respectively show the cross-section a–a' and the cross-section b–b' indicated in the top view FIG. 13A. In this light-receiving element, of the P layer serving as the light-receiving surface of the element, the part on which the grating is not formed is shielded with an aluminum wiring.

The number of the light-receiving portion(s) with gratings formed on one tip is not limited to one or two as in the above-mentioned embodiments, but more than two light-receiving portions with gratings which output signals having different phases from one another may be formed on the same tip.

Also, it is possible to form a small number of light-receiving portions with gratings on a tip, and to slice the wafer to obtain a plurality of tips as one light-receiving element.

The present invention can be realized not only by using photodiodes of different materials and different structures from those of the light-receiving elements in the above-mentioned embodiments, but also by employing photoelectric transfer devices, such as a phototransistor, a CdS cell, and so on, for outputting eletrical signals in response to the beams incident on the light-receiving portions.

In the present invention, processor circuits such as a voltage converter circuit, an amplifier circuit, and the like, and/or other kinds of circuit to be used together with the light-receiving element described above may be assembled in the tip (wafer) on which said light-receiving element is formed.

Figure 14:
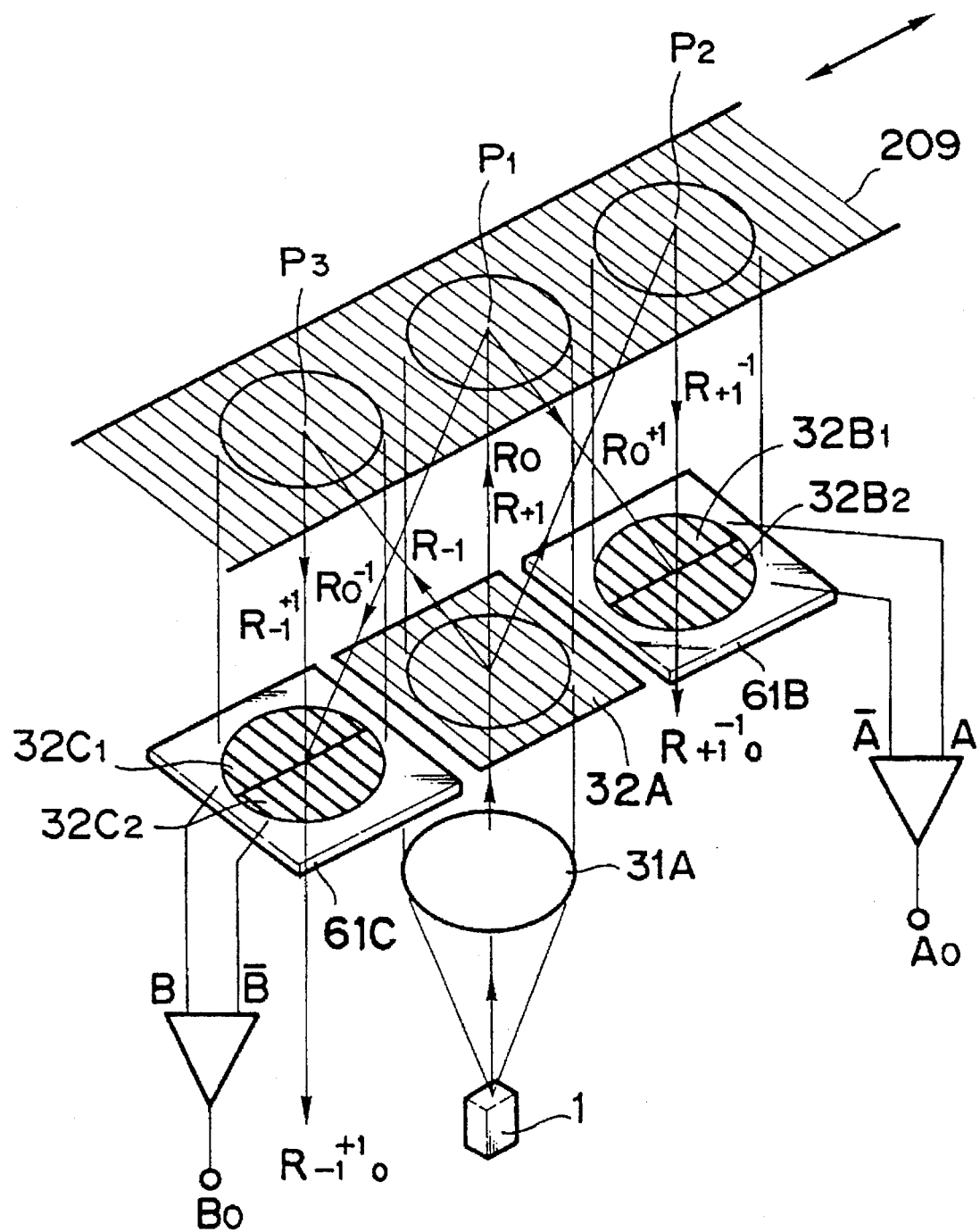
FIG. 14 is a schematic view showing an example of the construction of the information relating to displacement detection apparatus according to the present invention.

FIG. 14 shows an example of the construction of the displacement sensor provided with one of the light-receiving elements of the above-mentioned Embodiments 5 to 11.

This displacement sensor employes: a light-receiving element 61B comprising light-receiving portions 32B$_1$ and 32B$_2$ having gratings; and a light-receiving element 61C comprising light-receiving portions 32C$_1$ and 32C$_2$ having gratings, wherein fundamental construction of both the light-receiving element 61B and the light-receiving element 61C is the same as one of those of the light-receiving portions shown in FIGS. 7A to 13C. As this displacement sensor is provided with light-receiving elements 61B and 61C, which have diffraction gratings formed on the light-receiving surfaces of their light-receiving portions, the assembly and ragging of the light-receiving elements are effected with precision. Accordingly, the elements are not only small but detect displacement with precision.

In FIG. 14, the beam emitted from a light-emitting element 1 such as a semiconductor laser, a light-emitting diode, or the like is collimated by a lens 31A, and then, is incident vertically on a diffraction grating 32A. The beam is transmitted through and diffracted by the diffraction grating 32A, and is divided into a plurality of beams, including the 0th-order diffracted light R$_0$, the (+) 1st-order diffracted light R$_{+1}$ and the (−) 1st-order diffracted light R$_{-1}$, which are cast on a diffraction grating 20$c$ formed on a scale fixed to the object to be measured.

Incidentally, the diffraction grating 32A, the light-receiving portions 61B and 61C, and the diffraction grating 21 on the scale of this displacement sensor have the same pitch of 1.6 µm.

Of the diffracted light which is emitted from the diffraction grating 32A and cast on the diffraction grating 20$a$, the rectilinearly advancing 0th-order diffraction light R$_0$ is reflected and diffracted at a point P1 on the diffraction grating 20$a$ to be divided into the (+) 1st-order diffracted light R$_0^{+1}$, the (−) 1st-order diffracted light R$_0^{-1}$, and so on. At this time, the divided beams of diffracted light have their phases modulated. That is, as the scale (diffraction grating 21) moves, the phase of the (+) 1st-order diffracted light R$_0^{+1}$ is shifted by +2 $\pi$x/P, while the phase of the (−) 1st-order diffracted light R$_0^{-1}$ is shifted by −2 $\pi$x/P, wherein: x is the shifting amount of the diffraction grating 21; and P is the pitch of the diffraction grating 21.

The above-mentioned (+) 1st-order diffracted light R$_0^{+1}$ is again transmitted through and diffracted by diffraction gratings on the light-receiving portions 32B$_1$ and 32B$_2$ and is divided into the 0th-order diffracted light, the (−) 1st-order diffracted light and other beams of diffracted light, wherein the (−) 1st-order diffracted light R$_0^{+1}$ is obtained vertically with respect to the grating surface and the wave front thereof has a phase of +2 $\pi$x/P. On the other hand, the above-mentioned (−) 1st-order diffracted light R$_0^{-1}$ is again transmitted through and diffracted by diffraction gratings on the light-receiving portions 32C$_1$ and 32C$_2$ and is divided into the 0th-order diffracted light, the (+) 1st-order diffracted light and other beams of diffracted light, wherein the (+) 1st-order diffracted light R$_0^{-1}{}_{+1}$ is obtained vertically with respect to the grating surface and the wave front thereof has a phase of −2 $\pi$x/P.

In this displacement sensor, the diffraction grating on the light-receiving portion 32C$_1$ and the diffraction grating on the light-receiving portion 32B$_1$ are arranged so that their phases are shifted from each other by P/4, wherein the phase of the wave front of the (+) 1st-order diffracted light R$_0^{-1}{}_{+1}$ is further shifted by $-2^\pi$(P/4)/P(=−$\pi$/2) to be −2 $\pi$x/P−$\pi$/2. Further, the diffraction grating on the light-receiving portion 32B$_1$ and that of the adjacent light-receiving portion 32B$_1$, as well as the diffraction grating on the light-receiving portion 32C$_2$ and that of the adjacent light-receiving portion 32C$_1$, are arranged so as to be shifted from each other by P/2, wherein phases of the wave fronts of the beams incident on the light-receiving surfaces of respective light-receiving portions are determined as:

32B$_1$: −2 $\pi$x/P

32B$_2$: −2 $\pi$x/P−$\pi$ $32C_1$: $-2\pi x/P - \pi/2$ $32C_2$: $-2\pi x/P - 3\pi/2$

On the other hand, the (+) 1st-order diffracted light $R_{+1}$ is reflected and diffracted at a point P2 on the diffraction grating 20a on the scale to be divided into the (−) 1st-order diffracted light, the 0th-order diffracted light and other beams of diffracted light, each of which has its phase modulated. More, specifically, the (−) 1st-order diffracted light with the phase shifted by $-2\pi x/P$ is incident on the light-receiving portions $32B_1$ and $32B_2$, and of the (−) 1st-order diffracted light, the 0th-order diffracted light $R_{+1}^{-1}{}_0$ which rectilinearly advances through the diffracted gratings of the light-receiving portions $32B_1$ and $32B_2$ has the wave front whose phase is $-2\pi x/P$. The (−) 1st-order diffracted light $R_{-1}$ from the diffraction grating 32A is reflected and diffracted at a point P3 on the diffraction grating 20a on the scale to be divided into the (+) 1st-order diffracted light, the 0th-order diffracted light $R_{-1}^{0}$ and other beams of diffracted light, which have their phases modulated. More specifically, the (+) 1st-order diffracted light with the phase shifted by $+2\pi x/P$ is incident on the light-receiving portions $32C_1$ and $32C_2$, and of the (+) 1st-order diffraction light, the 0th-order diffracted light $R_{-1}^{+1}{}_0$ which rectilinearly advances through the light-receiving portions $32C_1$ and $32C_2$ has the wave front whose phase is $+2\pi x/P$.

The beam $R_{+1}^{-1}{}_0$ and the beam $R_0^{+1}{}_{-1}$ whose courses are overlapped with each other by the diffraction gratings of the light-receiving portions $32B_1$ and $32B_2$ are made to be two beams of interference light, which are incident on the light-receiving surface respectively corresponding to the light-receiving portions $32B_1$ and $32B_2$ and are converted into electrical signals. The interference phases of the interference beams incident on respective light-receiving surfaces of the light-receiving portions $32B_1$ and $32B_2$ are:

$(+2\pi x/P)-(-2\pi x/P)=4\pi x/P$ $(-2\pi x/P-\pi)-(+2\pi x/P)=-4\pi x/P-\pi$ wherein sine wave signals of one cycle are generated from the light-receiving portions $32B_1$ and $32B_2$ while the diffraction grating 20a on the scale is shifted by ½ of the pitch. As the pitch of the diffraction grating 20a is 1.6 μm, the resulting sine wave signals have a cycle of 0.8 μm. The signal A obtained from the light-receiving portion $32B_2$ has the phase which is the reverse of the phase of the signal A from the light-receiving portion $32B_1$.

The beam $R_{-1}^{+1}{}_0$ and the beam $R_0^{-1}{}_{+1}$ whose courses are overlapped with each other by the diffraction gratings of the light-receiving portions $32C_1$ and $32C_2$ are made to be two beams of interference light, which are incident on the light-receiving surfaces respectively corresponding to the light-receiving portions $32C_1$ and $32C_2$ and are converted into electrical signals. The interference phases of the interference beams incident on respective light-receiving surfaces of the light-receiving portions $32C_1$ and $32C_2$ are:

$(-2\pi x/P-\pi/2)-(+2\pi x/P)=-4\pi x/P-\pi/2$ $(-2\pi x/P-3\pi/2)-(+2\pi x/P)=-4\pi x/P-3\pi/2$ wherein sine wave signals of one cycle are generated from the light-receiving portions $32C_1$ and $32C_2$ while the diffraction grating 20a on the scale is shifted by ½ of the pitch. As the pitch of the diffraction grating 20a is 1.6 μm, the resultant sine wave signals have a cycle of 0.8 μm. The phase of the signal B from the light-receiving portion $32C_1$ and that of the signal A from the light-receiving portion $32B_1$ are shifted from each other by ¼ of one cycle, and the phase of the signal B from the light-receiving portion $32C_2$ and that of the signal A from the portion portion $32B_2$ are also shifted from each other by ¼ of one cycle.

With the above-mentioned construction, when the scale (diffraction grating 20a) is shifted, the displacement sensor can obtain four sine wave signals, whose phases are shifted at intervals of ¼ of one cycle, from the light-receiving elements 61B and 61C: that is, sine wave signals A(0), B(π/2), A(π) and B(3π/2), which indicate four different displacement amounts. On the basis of these four sine wave signals, and by using well-known signal processor circuit, relative displacement of the scale (20a) with respect to the light-receiving portions (61B and 61C) and the light-projecting units (1, 31A, 32A) is detected.

Any of the elements shown in FIGS. 7 to 13 can be applied, without modifications or with preferable modifications, as the light-receiving element, to the above-mentioned displacement sensor.

The application of the dispalcement sensor employing the light-receiving elements shown in FIGS. 7A to 13C. Without modifications or with preferable modifications, is not limited to the linear encoder shown in FIG. 14, but the displacement sensor can be applied, for example, to a rotary encoder and an optical speed meter.

Figure 15:
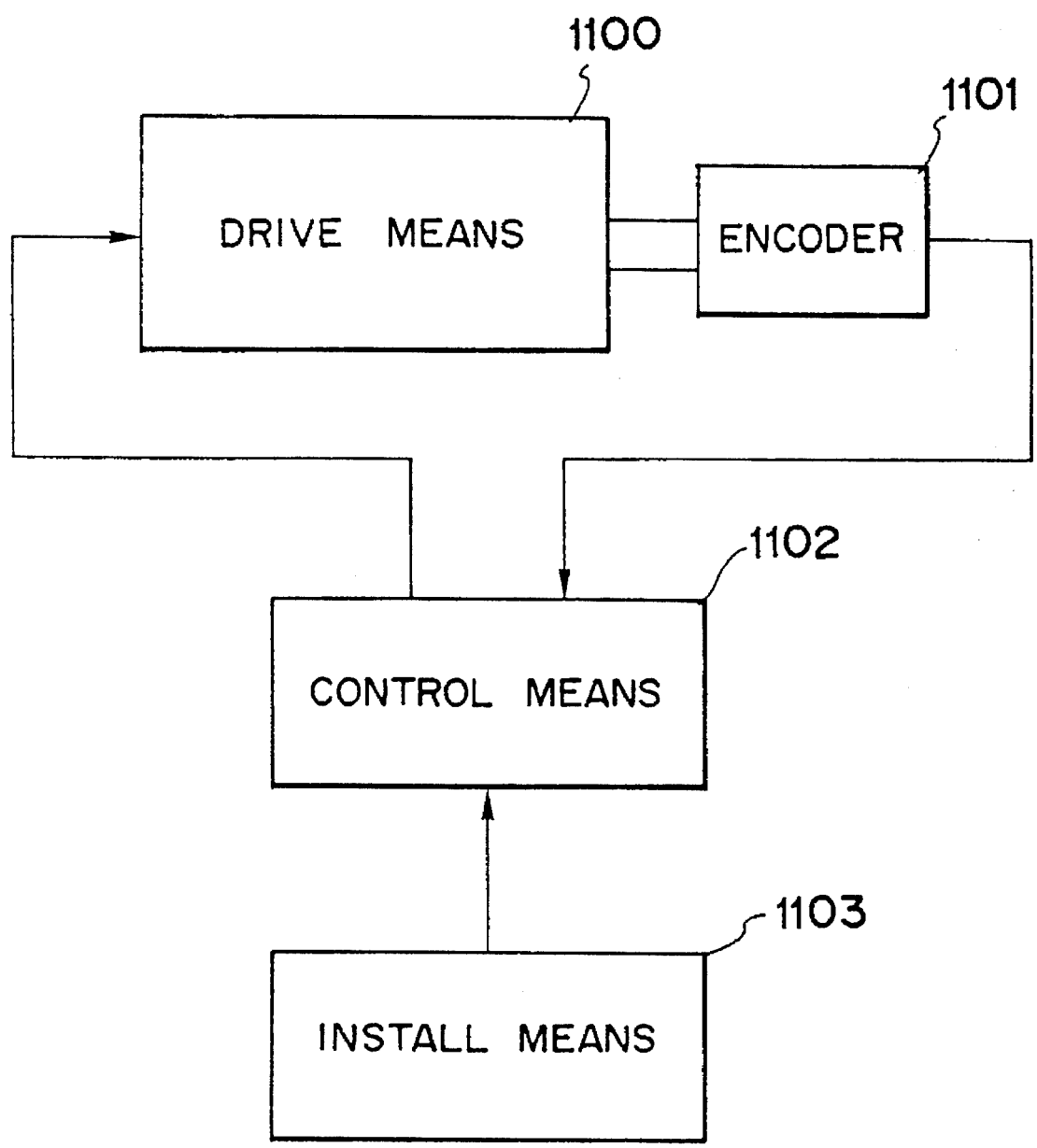
FIG. 15 is a block diagram showing an example of a drive system provided with the information relating to displacement detection apparatus according to the present invention.

FIG. 15 is a block diagram of a drive system exemplified as an embodiment, to which one of the above-mentioned encoders is applied as the displacement sensor. To the drive output unit of a drive means 1100 having a driving source such as a motor, an actuator, an engine, or the like, or to the shifting portion of a driven object, an encoder 1101, which is one of the above-mentioned displacement sensors, is attached in order to detect shifting conditions such as the shifting amount, shifting speed, and the like. When the encoder of the embodiment shown in FIG. 15 is employed, detection output of the encoder 1101 is fed back to a control means 1102, which transmits a drive signal to the drive means 1100 so as to realize the conditions installed by an install means 1103. By forming such a feed back system, drive conditions installed by the install means 1103 can be obtained. This drive system can be widely applied, for example, to business apparatus such as a typewriter, a printer, a copying machine, a facsimile apparatus, and so on as well as to image apparatuses such as a camera, a video apparatus, and the like; further, to an information recording/reproducing apparatus, a robot, a machine tool, a manufacturing apparatus, a transport apparatus; and all kinds of other apparatus having drive means.

As described above, according to the above-mentioned embodiments, simple and small-size light-receiving elements in which grating pattern and the light-receiving portion of the light-receiving element are integrated. Further, small-size, highly precise displacement sensors can be easily realized.

In the following embodiments, a detection apparatus performs detection concerning a target object by synthesizing two beams from the target object by a synthesizing elements and receiving resultant light by light-receiving elements, wherein said synthesizing element is formed, immediately or by lamination, on the surface of a light-translucent resin in which the light-receiving elements are airtightly sealed.

In one of the following embodiments, an apparatus performs detection concerning the target object by splitting or deflecting a beam from a light-emitting element by an optical element, illuminating the target object with the split or polarized beam(s) and receiving the beam(s) from the target object by light-receiving elements, wherein the optical element is formed, immediately or by lamination, on the surface of a transmitting resin in which the light-receiving element is air-hermetically sealed.

In one of the following embodiments, a detection apparatus performs detection concerning the target object by splitting or deflecting a beam from a light-emitting element by an optical element, synthesizing the two beams which are transmitted through the optical element and return from the target object by synthesizing elements and receiving resultant light by light-receiving elements, wherein at least either the optical element or the synthesizing elements are formed, immediately or by lamination, on the surface of a light-translucent resin in which the light-emitting element and the light-receiving elements are sealed airtight sealed.

Furthermore, in one of the following embodiment, a detection apparatus detects information of relative displacement of diffraction gratings to be measured by splitting a beam from a light-emitting element by an optical element to form at least two beams, making the beams incident on the diffraction gratings to be measured to generate at least two beams of diffracted light, synthesizing them by synthesizing elements to obtain interference light and receiving the interference light by a light-receiving element, wherein at least either the optical element or the synthesizing elements are formed, immediately or by lamination, on the surface of a translucent resin in which the light-receiving element is airtightly sealed.

Figure 16:
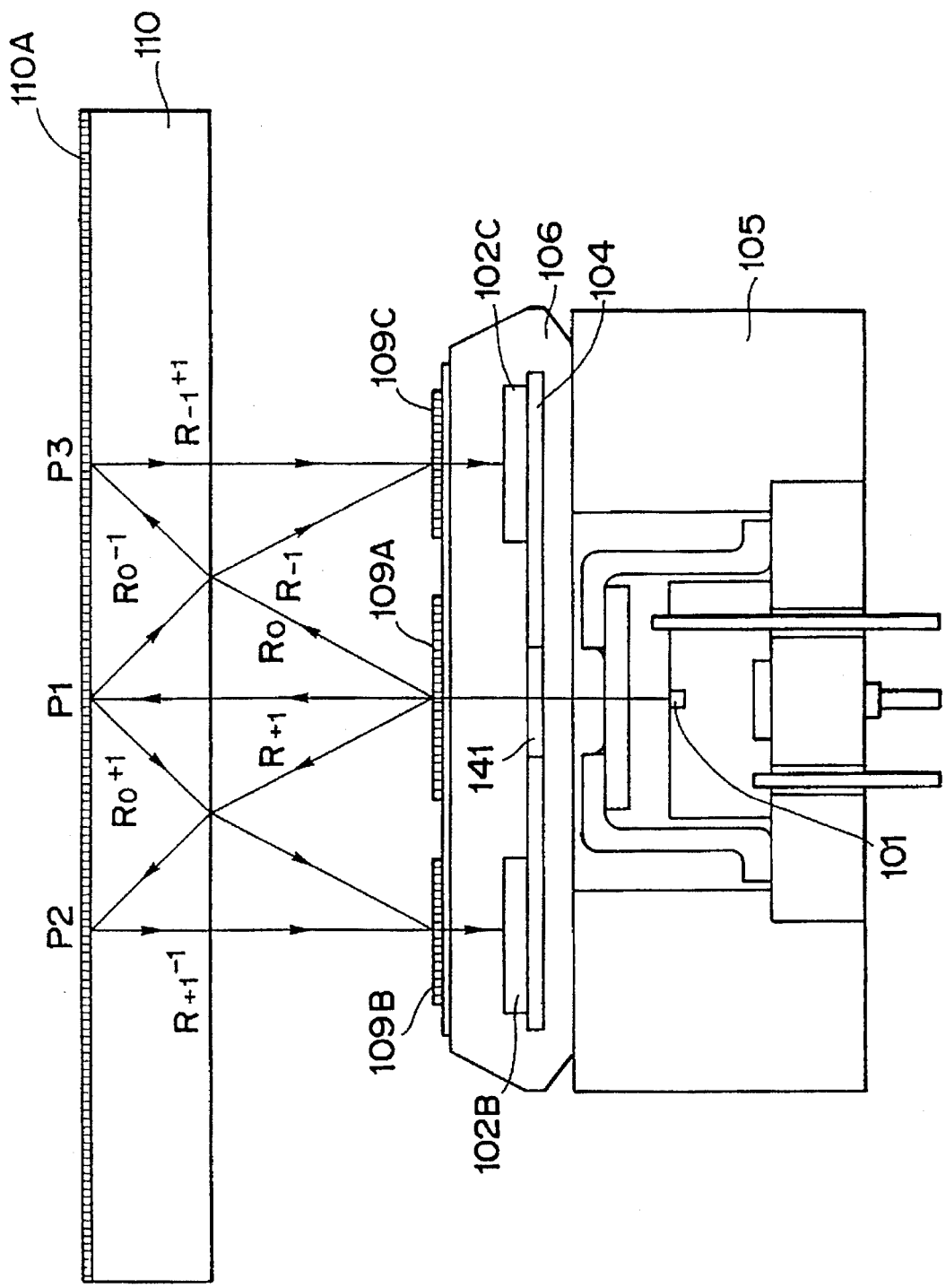
FIG. 16 is a schematic cross-sectional view showing Embodiment 12.

FIG. 16 is a schematic cross-sectional view showing Embodiment 12, where reference numeral 101 denotes a semiconductor laser. Light-receiving elements 102B, 102B', 102C and 102C' are mounted on a lead frame bed 104, Which has an opening 141 through which the beam emitted from the semiconductor laser 101 passes. Reference numeral 105 denotes a holder of the semiconductor laser unit. The light-receiving elements are sealed airtight in a transparent resin 106. Reference numerals 109A, 109B and 109C denote diffraction gratings, and reference numeral 110 denotes a scale. The light-receiving elements 102B' and 102C', which are situated respectively behind the light-receiving elements 102B and 102C, are not shown in this figure.

In this embodiment, the lead frame, on which the light-receiving elements are mounted, has an opening 141 in the IC bed position 104 through which the light emitted from the semiconductor laser 101 serving as the light-emitting element. First, the light-receiving elements 102B, 102B', 102C and 102C' are fixed on the lead frame by die bonding, then, wire bonding is executed between the lead frame and electrode pads of the light-receiving elements 102B, 102B', 102C and 102C'. Subsequently, the light-receiving elements 102B, 102B', 102C and 102C' are air-hermetically sealed in the transparent resin 106 by the transfer mold technique. The above processes are the same as those of the conventional method for manufacturing plastic packages of semiconductor elements.

Next, a glass substrate is coated with a resist, patterns of the diffraction gratings are drawn by exposure, and resist patterns of the diffraction gratings are formed on the glass substrate by developing the resist. Then, the glass substrate is dry-etched to form the diffraction gratings thereon, and the resist is removed. In this way, the mold of the diffraction gratings is prepared.

Figure 17:
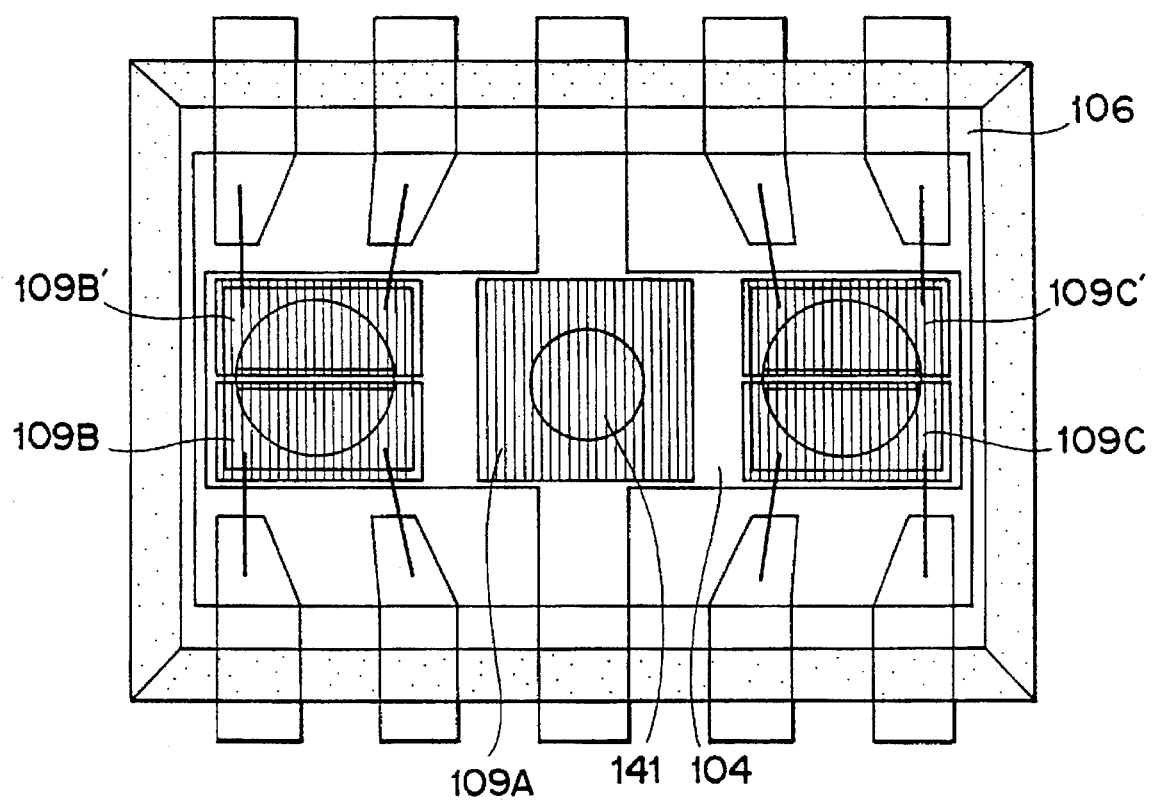
FIG. 17 is a schematic top view showing Embodiment 12.

Next, the glass substrate mold is coated with resin curable with ultraviolet rays. Light-receiving portions of respective light-receiving elements are positioned with respect to the diffraction gratings formed on the glass substrate. The surface of the transparent resin of the package is brought into contact with the mold. The glass substrate is exposed, from the rear side, to ultraviolet rays to cure the curable resin. After that, the package is separated from the glass substrate. In this way, the resin cured with ultraviolet rays, which forms the diffraction gratings 109A, 109B, 109B', 109C and 109C', are transferred onto the surface of the transparent resin 106 of the package. FIG. 17 is a top view of the package surface on which respective diffraction gratings are formed.

The package having diffraction gratings 109A, 109B, 109B', 109C and 109C' formed, as described above, on the surface of the transparent resin 106 is put on the semiconductor laser holder 105 containing the semiconductor laser 101, positioned so that the light-emitting center of the semiconductor laser is fixed at a predetermined position, and bonded fixedly to the semiconductor laser holder 105.

After that, respective electric terminals are connected with corresponding lead wires to make the head of the optical displacement sensor.

In the optical displacement sensor head prepared by the above-mentioned manufacturing method, the light-receiving elements 102B, 102B', 102C and 102C', which are semiconductor elements, are air-hermetically sealed in the translucent resin 106, wherein reliability thereof is ensured and the manufacturing cost thereof remains low. Further, as the diffraction gratings 109A, 109B, 109B', 109C and 109C' are provided on the surface of the package, they are very easily formed. As the diffraction gratings are formed while positioned with respect to the light-receiving portions, they are formed with high precision. Furthermore, the positional relation therebetween are hard to change after formation.

Now, operations of the optical displacement sensor constructed as described above will be explained. In this embodiment, the beam emitted from the semiconductor laser 101 is incident on the rear surface of the package containing the light-receiving elements 102B, 102B', 102C and 102C', passes through the opening 141 in the lead frame bed portion 104, is transmitted and diffracted by the diffraction grating 109A formed on the package surface and is divided into the 0th-order diffracted light $R_0$, the (+) 1st-order diffracted light $R_{+1}$, the (−) 1st-order diffracted light $R_{-1}$, and so on, which are emitted from the package.

The beam $R_0$ advancing rectilinearly through the diffraction grating 109A is reflected and diffracted at a point P1 on a diffraction grating 110A formed on the scale 110 to be divided into the (+) 1st-order diffracted light $R_0^{+1}$, the (−) 1st-order diffracted light $R_0^{-1}$, wherein phases of the divided beams are modulated.

The phase of the (+) 1st-order diffracted light $R_0^{+1}$ is shifted by +2 πx/P and that of the (−) 1st-order diffracted light $R_0^{-1}$ is shifted by −2 πx/P, where x is the shifting amount of the diffraction grating 110A of the scale 110; and P is the pitch of the diffraction grating 110A.

A description similar to that of the diffraction gratings 109B and 109C holds true for the diffraction gratings 109B' and 109C', so the description of the diffract gratings 109B' and 109C' is omitted. The (+) 1st-order diffracted light $R_0^{+1}$ is transmitted through and diffracted by the diffraction grating 109B formed on the package surface to be divided into the 0th-order diffracted light $R_0^{+1}{}_0$, the (−) 1st-order diffracted light $R_0^{+1}{}_{-1}$ and other beams, of which the (−) 1st-order diffracted light $R_0^{+1}{}_{-1}$ is taken out Vertically from the diffraction grating surface and the phase of its wave front is +2 πx/P.

The (−) 1st-order diffracted light $R_0^{-1}$ is transmitted through and diffracted by the diffraction grating 109C formed on the package surface to be divided into the 0th-order diffracted light $R_0^{-1}{}_0$, the (+) 1st-order diffracted light $R_0^{-1}{}_{+1}$ and other beams, of which the (−) 1st-order diffracted light $R_0^{-1}{}_{+1}$ is taken out vertically from the diffraction grating surface and the phase of its wave front is −2 πx/P.

If the diffraction gratings 109B and 109C are arranged so that their phases are shifted from each other by P/4, the phase of the wave front of the (+) 1st-order diffracted light $R_0^{-1}{}_{+1}$ is further shifted by −2 π(P/4)/P(=−π/2) to be −2 πx/P−π/2.

The (+) 1st-order diffracted light $R_{+1}$ diffracted by the diffraction grating 109A formed on the surface of the transparent resin 106 is reflected and diffracted at a point P2 on the diffraction grating 110A on the scale 110 to be divided into the (−) 1st-order diffracted light $R_{+1}{}^{-1}$, the 0th-order diffracted light $R_{+1}{}^0$ and other beams, while their phases are modulated. Among the beams, the (+) 1st-order diffracted light $R_{-1}{}^{+1}$ has its phase shifted by +2 πx/P and is incident on the diffraction grating 9B, while the phase of the wave front of the rectilinearly advancing 0th-order diffracted light $R_{-1}{}^{+1}{}_0$ is +2 πx/P.

The beams $R_{+1}{}^{-1}{}_0$ and $R_0{}^{+1}{}_{-1}$ have their courses overlapped with each other at the diffraction grating 109B to be interference light, which is incident on the light-receiving element 102B. At this time, the interference phase is (+2 πx/P)−(−2 πx/P)=4 πx/P, wherein one cycle of occulting signal is generated while the diffraction grating 110A on the scale 110 is shifted by ½ of the pitch.

The beams $R_{-1}{}^{+1}{}_0$ and have their courses overlapped with each other at the diffraction grating 109C to be interfere light, which is incident on the light-receiving element 102C. At this time, the interference phase is (−2 πx/P−π/2)−(+2 πx/P)=4 πx/P−π/2, wherein one cycle of occulting signal is generated while the diffraction grating 110A on the scale 110 is shifted by ½ of the pitch, and timing of the occulting signal here is shifted from that of the occulting signal at the light-receiving element 102B by ¼ of one cycle.

As the diffraction gratings 109A' and 109B' are arranged so that the phases of the diffraction gratings 109A' and 109A, as well as those of the diffraction gratings 109B' and 109B, are shifted from each other by P/2, the phases of the wave fronts from the diffraction gratings 109A' and 109A, as well as those of the wave fronts from the diffraction gratings 109B' and 109B, are shifted from each other by π. Therefore, the light-receiving elements 102B' and 102C' receive respective occulting signal with the timing shifted from that of the above-mentioned respective corresponding occulting signals by ½ of one cycle. Signals from the light-receiving elements are converted into a two-phase signal which is obtained from the differential signal of the outputs from the light-receiving elements 102B and 102B' and the differential signal of the outputs from the light-receiving elements 102C and 102C'. By utilizing the two-phase signal, the displacement amount and the displacement direction of the scale 110 can be obtained by the well-known methods.

Figure 18:
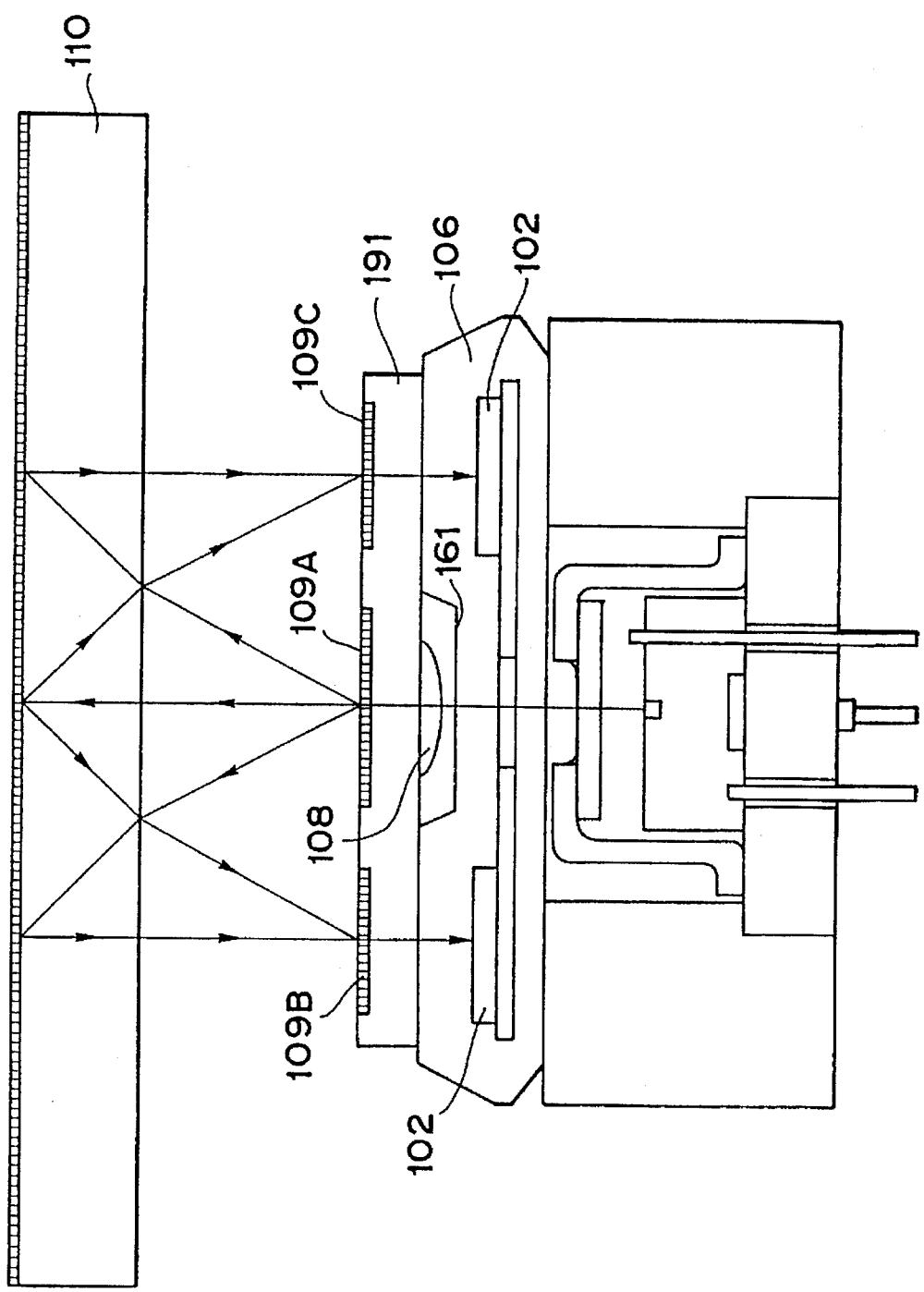
FIG. 18 is a schematic cross-sectional view showing Embodiment 13.

FIG. 18 is a schematic cross-sectional view showing Embodiment 13, wherein the same portions as those in the previous embodiment are indicated by the same reference numerals.

In this embodiment, the metal mold for transfer molding, which is used to seal the light-receiving elements 102 in the translucent resin 106, has a convex part to form a concave portion 161 in the package. The concave portion has dimensions in which a convex lens 108 and the package do not interfere with each other as described later. The package containing the light-receiving elements 102 has the same construction as that of Embodiment 12 except for the above-mentioned respect.

In this embodiment, a glass substrate 191 is coated with a resist, patterns of the diffraction gratings are drawn by exposure, and the resist is developed. Then, the glass substrate 191 is dry-etched to carve the diffraction gratings on the glass substrate 191, and the resist is removed. Next, the convex lens 108 is formed on the surface opposite to the surface on which the diffraction grating 109A for the emitted beam. is formed, wherein the convex lens 108 is transferred onto the glass substrate 191 by using the metal mold and the resin curable with ultraviolet rays as the diffraction gratings of Embodiment 12 are formed.

Next, the diffraction gratings 109B, 109B', 109C and 109C' are positioned with respect to the light-receiving portions of the corresponding light-receiving elements, and the glass substrate 91 and the above-mentioned transparent resin package are bonded to each other to form the diffraction gratings above the light-translucent resin. At this time, the concave portion 161 is provided in the package so that the convex lens 108 formed on the glass substrate is not interfered with the package.

The package having the diffraction gratings and the convex lens 108 formed over the light-translucent resin 106 as described above is positioned on the semiconductor laser holder 105 containing. the semiconductor laser 101 so that the light-emitting center of the semiconductor laser is fixed at a predetermined position with respect to the convex lens 108. Then, the package is bonded fixedly to the semiconductor laser holder 105.

Subsequently, electrical terminal are connected with corresponding lead wires to make the head of the optical displacement sensor. The operations thereof are the same as those described above.

In this embodiment, the divergent beam emitted from the semiconductor laser 101 is collimated or focused to realize the optical displacement sensor which has increased intensity of signal light and whose signal is hard to change against disturbance caused by attachment of the sensor or positioning thereof in operation.

Figure 19:
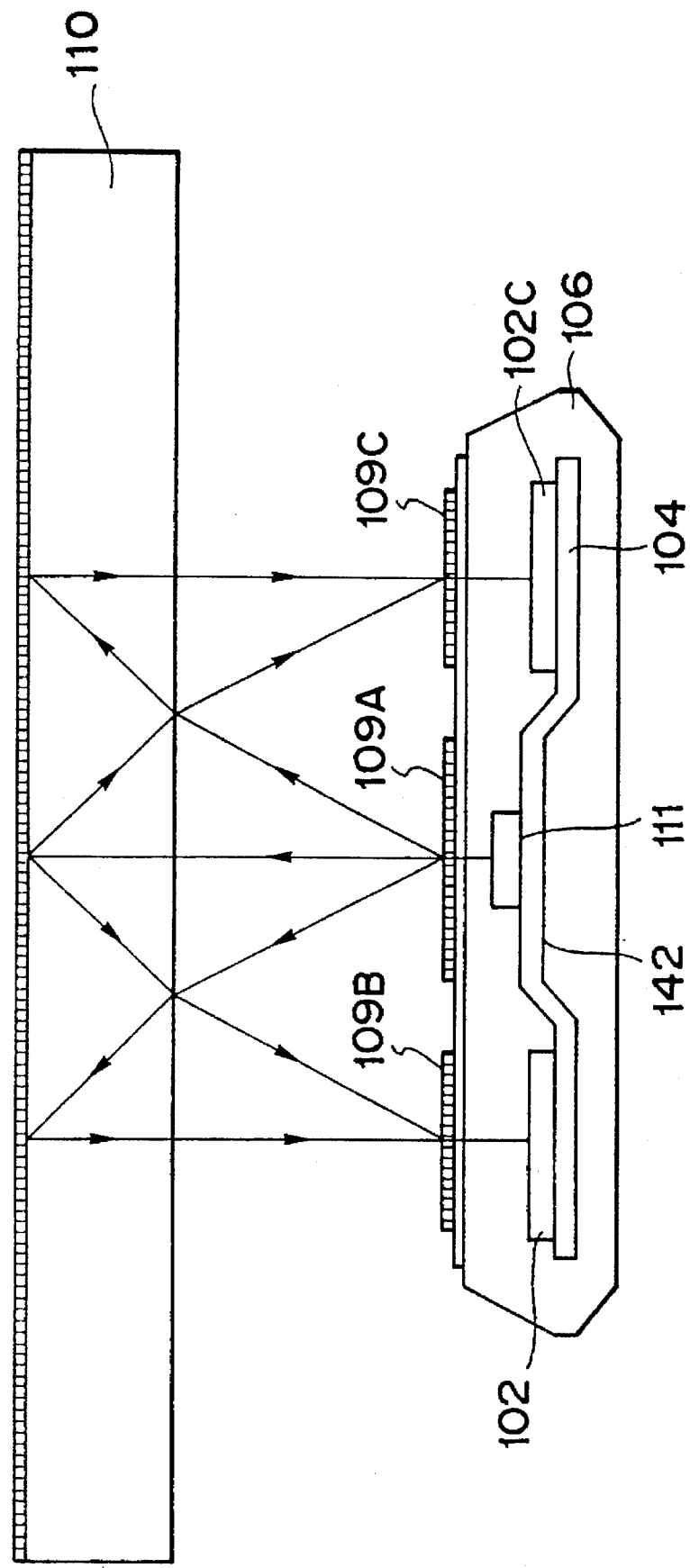
FIG. 19 is a schematic cross-sectional view showing Embodiment 14.
Figure 20:
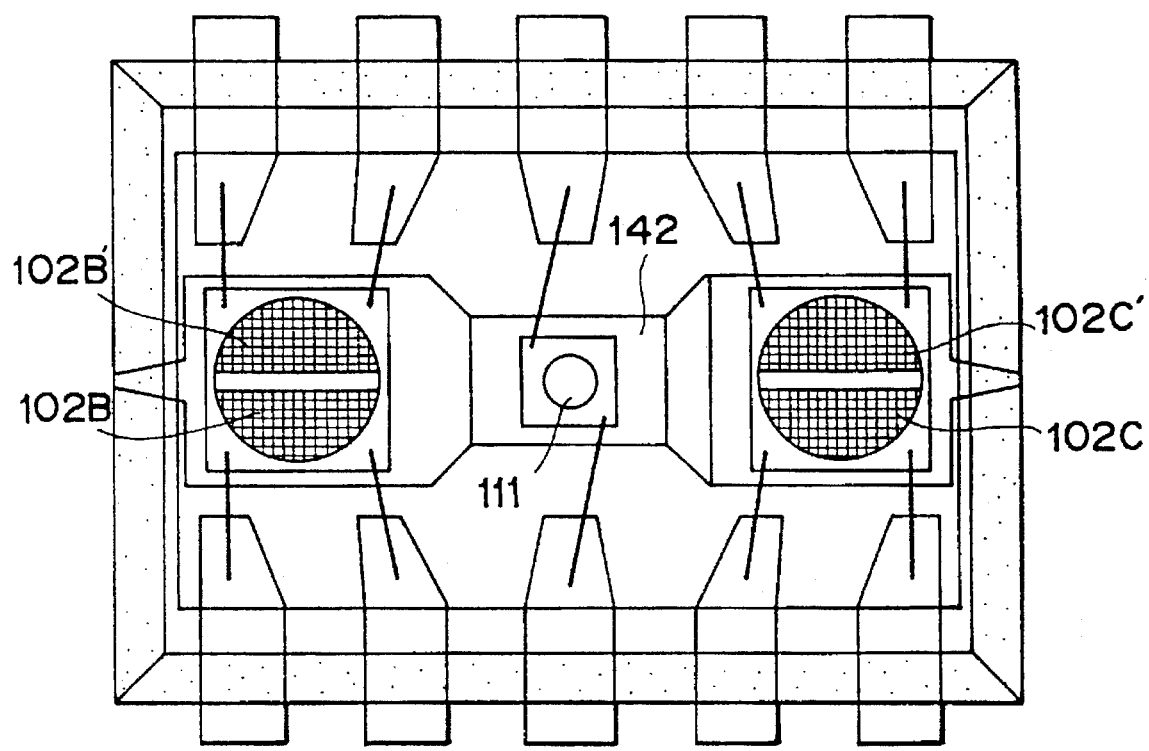
FIG. 20 is a schematic top view showing a lead frame unit of Embodiment 14.

FIG. 19 is a schematic cross-sectional view showing Embodiment 14, where the same members as those already described are indicated by the same reference numerals. FIG. 20 is a top view of the lead frame unit.

In this embodiment, an LED serving as the light-emitting element and the light-receiving elements are contained in the same light-translucent resin package. Thus, when in the package the divergent beams from the LED, the light-emitting element are incident on the light-receiving portions of the light-receiving elements, SN ratio is reduced. Therefore, the bed portion of the lead frame 104 on which the LED 111 is mounted is made higher by press machine than the bed portion on which the light-receiving elements are mounted.

In the lead frame having such a shape, the difference in height between the light-emitting portion of the LED 111 and the light-receiving portions of the light-receiving elements is large enough to reduce the amount of light from the LED 111 which is unnecessarily incident on the light-receiving portions.

On thus prepared transparent resin package, diffraction gratings are formed in the same manner as that of Embodiment 12. The operations thereof are the same as those described above.

As the optical displacement sensor constructed as described above contains the light-emitting element, the apparatus is very small, is capable of preventing stray light within the package and ensuring high SN ratio, and is manufactured at a very low cost.

Figure 21:
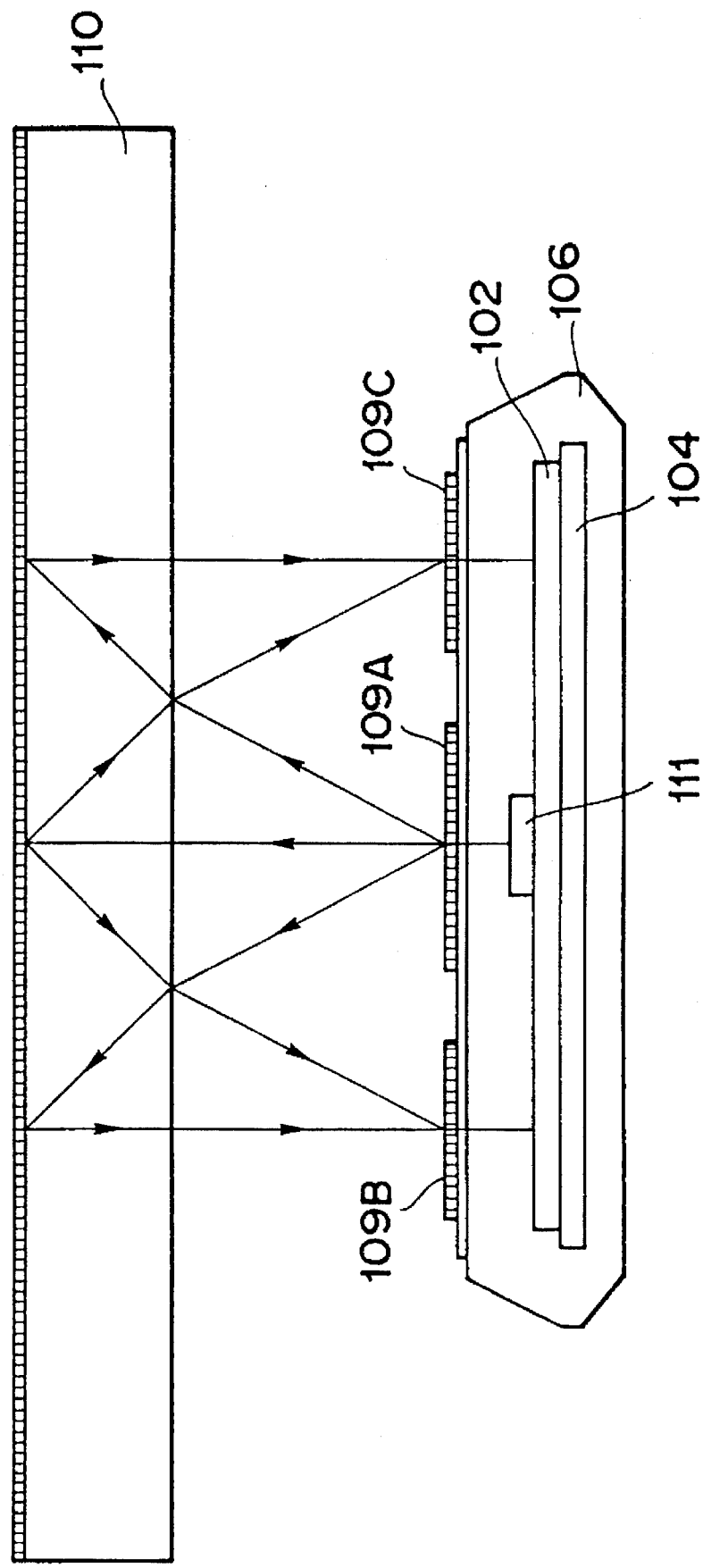
FIG. 21 is a schematic cross-sectional view showing Embodiment 15.
Figure 22:
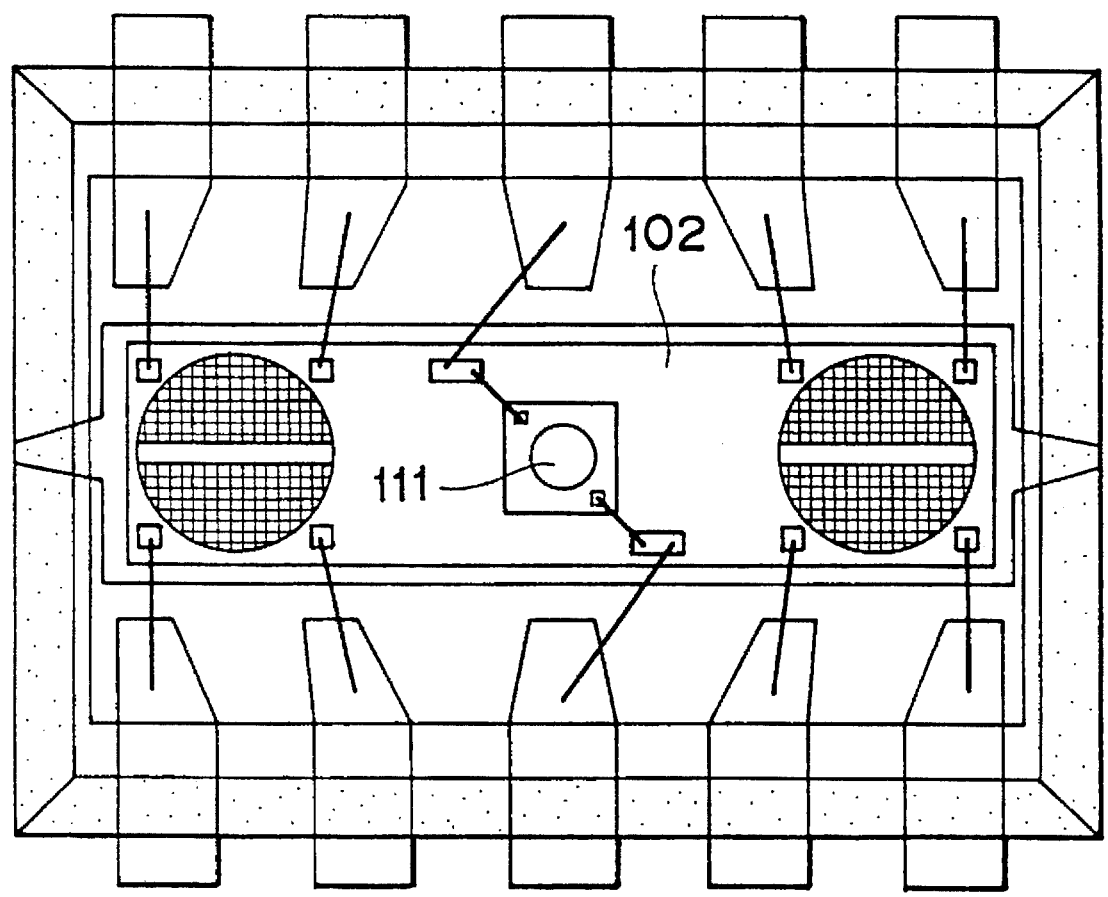
FIG. 22 is a schematic top view of a lead frame unit of Embodiment 15.

FIG. 21 is a schematic cross-sectional view showing Embodiment 15, and FIG. 22 is a top view of the lead frame unit thereof. The same members as those described above are indicated by the same reference numerals.

in this embodiment, the light-emitting element and the light-receiving elements are also, as in Embodiment 14, contained in the same light-translucent resin package, wherein the light-emitting portion and the light-receiving portions are mounted at a sufficient height in order to improve the SN ratio.

Accordingly, in this embodiment, the base 102 of the light-receiving elements is larger and common to the four light-receiving elements. The base is mounted on the lead frame, then the LED 111 is mounted on a part of the surface other than the light-receiving portions of the light-receiving elements and the lead electrode portions. Subsequently, respective electrode portions are connected with corresponding electric terminals of the lead frame by wire bonding. Then they are air-hermetically sealed in the transparent resin 106 to make the package.

The diffraction gratings 109 are formed on the light-translucent resin surface in the same manner as that of Embodiment 12. The operations thereof are also the same as those described above.

Figure 24:
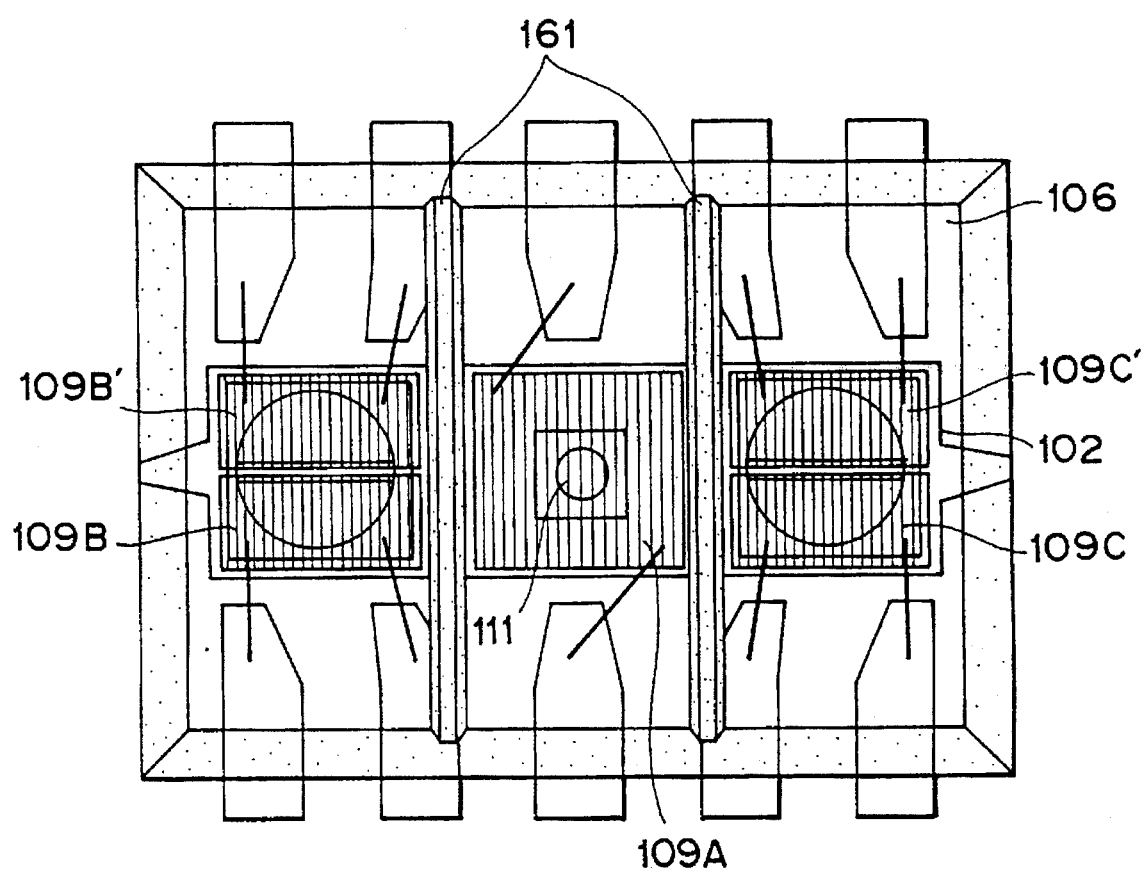
FIG. 24 is a schematic top view showing Embodiment 16.

FIG. 23 is a schematic cross-sectional view showing Embodiment 16, and FIG. 24 is a top view of the same. The same members as those described above are indicated by the same reference numerals.

In this embodiment, also the optical displacement sensor is constructed as described above. As shown in FIG. 23, however, further grooves 162 are formed between the light-emitting center and the light-receiving portions in the light-translucent resin 106 in order to prevent scattered light from the LED 111 serving as the light-emitting element from being incident on the light-receiving portions inside the package, thereby intercepting the internal scattered light before it reaches the light-receiving portions. The grooves 62 are formed by the same method employed in Embodiment 13 except that the metal mold used for forming the package has portions corresponding to the shape of the grooves.

Figure 25:
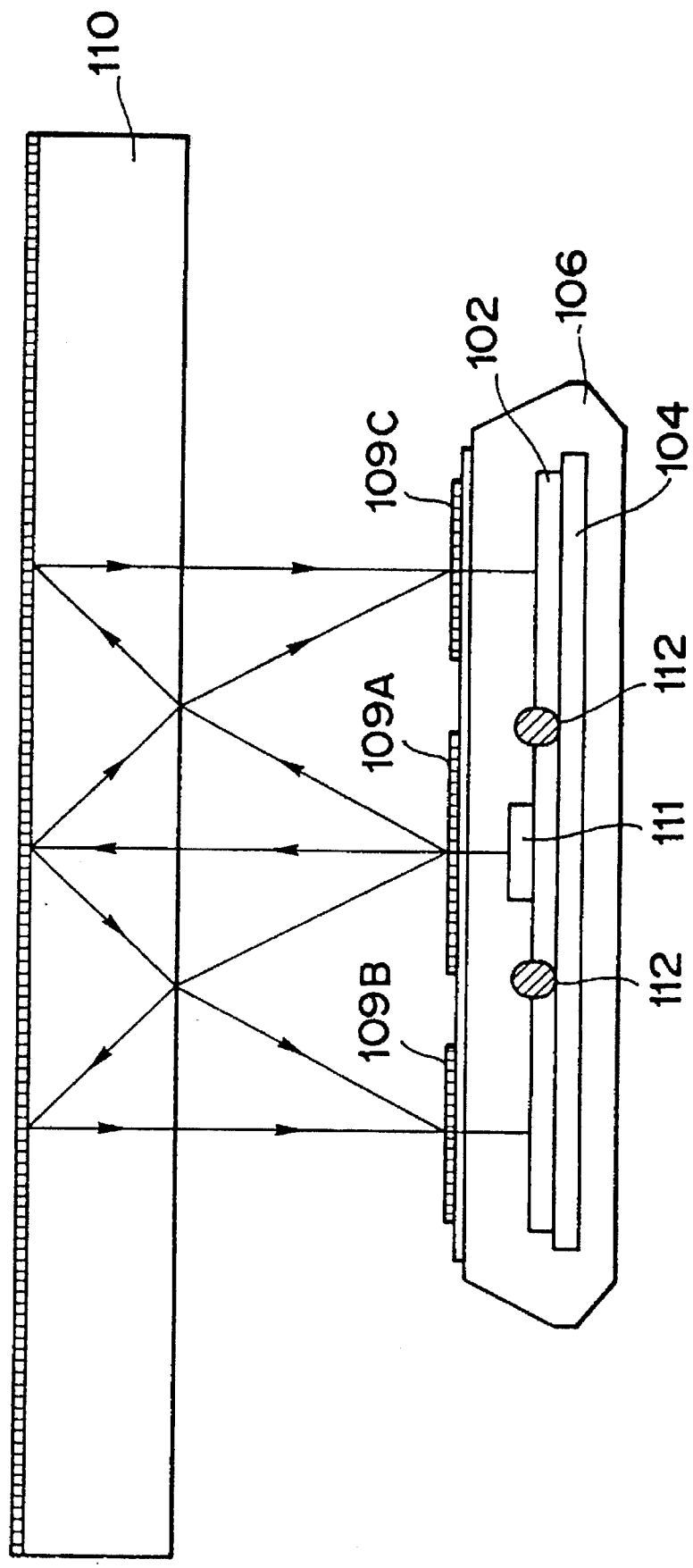
FIG. 25 is a schematic cross-sectional view showing Embodiment 17.
Figure 26:
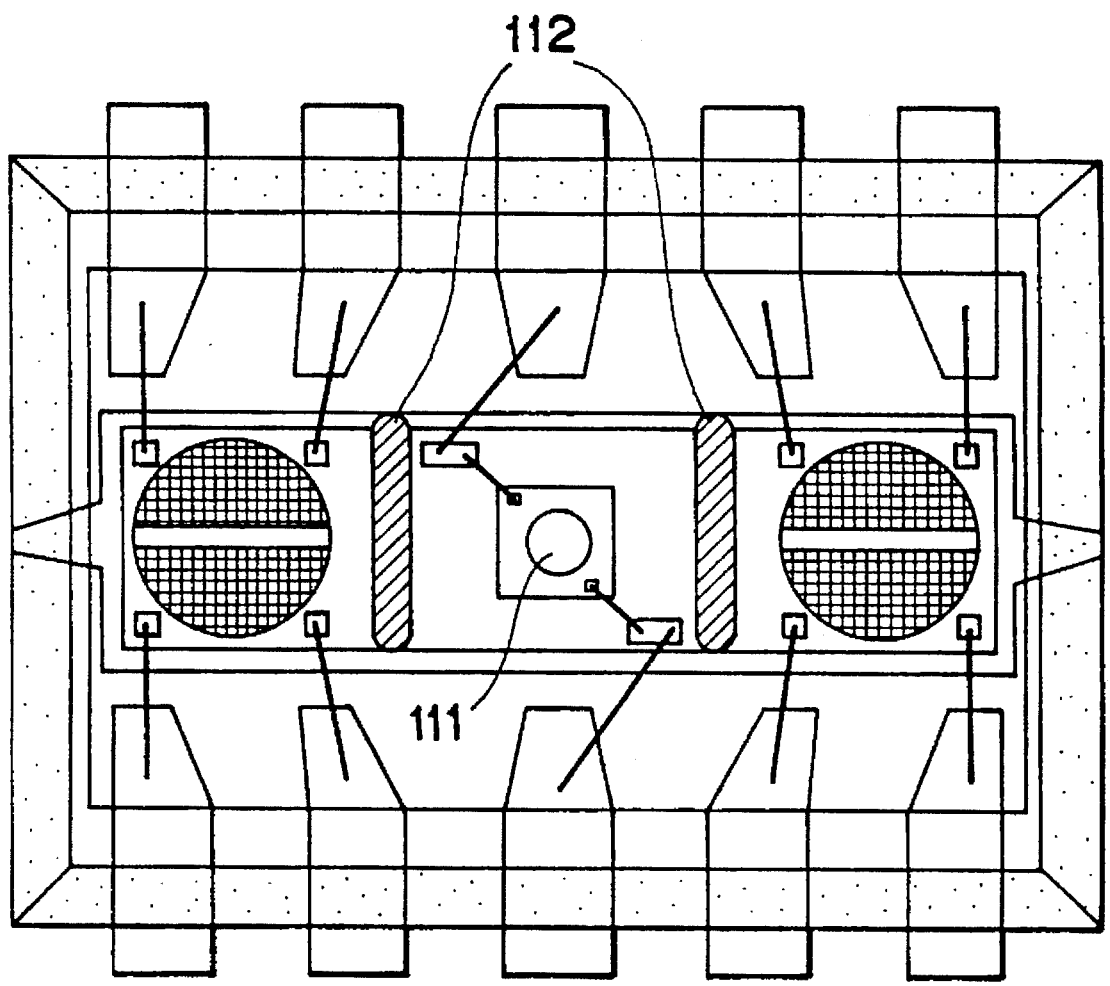
FIG. 26 is a schematic top viewing a lead frame unit of Embodiment 17.

FIG. 25 is a schematic cross-sectional view showing Embodiment 17, and FIG. 26 is a top view of the lead frame unit of the same. The same members as those described above are indicated by the same reference numerals.

This embodiment is the same as the previous embodiments except that the light-receiving elements 102 have their surfaces between the LED 111 and the light-receiving portions coated with light-absorbing coating material 112 so that prevent multiple reflection at the package surface and the shielding aluminum on the surfaces of the light receiving elements 102, thereby preventing scattered light from being incident on the light-receiving portions.

As the light-emitting elements used in the respective embodiments described above, semiconductor lasers, light-emitting diodes, and the like may be employed.

As the light-receiving elements, photodiodes, avalanche photodiodes, pin photodiodes, CCDs, as well as light-receiving ICs having the above light-receiving elements and circuits for amplifying or processing output photocurrents, may be employed.

Methods for manufacturing the gratings serving as optical components include: the replica method in which a mold is formed, resin curable with ultraviolet rays is cast into the mold, a transfer member is put thereon, and resin is exposed to ultraviolet rays to be cured and transferred onto the transfer member; the etching method in which a glass substrate is coated with a resist, patterns are drawn by exposure through a mask or a reticle, the resist is developed and etching is carried out; and so on. Otherwise, the resist may be directly drawn with an EB (electron beam) previous to development and etching. Further, after exposure of the resist described above, the gratings may be obtained by hard-bake. The gratings may be formed immediately on the surface of the translucent resin 106.

Furthermore, SN ratio can be further improved by combining the above-mentioned respective embodiments.

The above-mentioned embodiments can improve airtightness of the light-emitting elements or the light-receiving elements, thereby realizing the optical detection apparatus which can be easily manufactured with high precision and can maintain said high precision.

What is claimed is:

1. An apparatus for detecting information relating to displacement of an object on which a grating scale is affixed, comprising:

a beam-emitting system for irradiating the grating scale with a beam, wherein said beam-emitting system has a light source and a first diffraction grating for splitting beams from said light source, wherein at least two beams of diffracted light from the first diffraction grating are incident on said grating scale; and a light-detecting element having a photoelectric conversion surface, and a light blocking member being integrally formed on at least a part of the surface of said photoelectric conversion surface, for detecting a beam from the grating scale which is irradiated by the beam from said beam-emitting system, wherein said light blocking member has a light transmission portion in the shape of a grating whose pitch is the same as the pitch of an interference fringe formed by at least two beams of diffracted light from said grating scale, and wherein information relating to displacement of the object is detected on the basis of the detection by said light-detecting element.

2. An apparatus according to claim 1, further comprising a base member on which said light-detecting element is provided and at least one additional light-detecting element identical to said light-detecting element provided on said base member.

3. An apparatus according to claim 1, further comprising at least one additional light-detecting element identical to said light-detecting element and having a photoelectric conversion surface and at least one additional light blocking member and wherein said at least one additional light blocking member and said light blocking member have light transmission portions in the shape of a grating whose phases are different from each other in the direction in which displacement of the grating scale is measured.

4. An apparatus according to claim 1, further comprising at least two additional light-detecting elements identical to said light-detecting element, wherein said at least two additional light detecting elements are for a reference and are not provided with a light-blocking member on light-receiving surfaces thereof, wherein detection signals from said at least two additional light-detecting elements for the reference are utilized as reference signals.

5. An apparatus according to claim 1, wherein said light blocking member has a slit-shaped aperture.

6. An apparatus according to claim 1, wherein said light blocking member has diffraction gratings.

7. An apparatus according to claim 1, wherein said light blocking member is formed by a lithography technique.

8. An apparatus according to claim 7, wherein said light blocking member are composed of resist material.

9. An apparatus according to claim 7, wherein said light blocking member is formed as part of wiring patterns.

10. An apparatus according to claim 7, wherein said light blocking member is formed on a light-translucent layer covering a semiconductor layer.

11. An apparatus according to claim 10, wherein said light blocking member is formed as part of the light-translucent layer covering the semiconductor layer.

12. An apparatus according to claim 7, wherein said light blocking member is formed by at least one of the P layer and the N layer of the semiconductor layer.

13. An apparatus according to claim 1, wherein said light blocking member is formed, immediately or laminatedly, on the surface of a light-translucent resin which air-hermetically seals said light-detecting element.

14. An apparatus according to claim 13, wherein said light source is also air-hermetically sealed in said light-translucent resin.

15. An apparatus according to claim 13, wherein said first diffraction grating is formed, immediately or laminatedly on the light-translucent resin surface.

16. An apparatus according to claim 1, wherein said light blocking member synthesizes at least two beams of diffracted light from said grating scale.

17. An apparatus for controlling the driving of an object, comprising:

a drive unit for displacing two objects relative to each other;

a grating scale provided on one of the two objects;

a beam-emitting system for irradiating the grating scale with a beam, wherein said beam-emitting system has a light source and a first diffraction grating for splitting beams from said light source, wherein at least two beams of diffracted light from the first diffraction grating are incident on said grating scale;

a light-detecting element having a photo-electric conversion surface and a light blocking member being integrally formed on at least a part of a surface of said photoelectric conversion surface for detecting a beam from said grating scale which is irradiated by the beam from said beam-emitting system, wherein said light blocking member has a light transmission portion in the shape of a grating whose pitch is the same as the pitch of an interference fringe formed by at least two beams of diffracted light from said grating scale, and information relating to displacement of the object is detected on the basis of detection by said light detecting element; and a control unit for controlling said drive unit on the basis of the information detected by said light-detecting element.

* * * * *

UNITED STATES PATENT AND TRADEMARK OFFICE
CERTIFICATE OF CORRECTION

PATENT NO. : 5,657,125
DATED : August 12, 1997
INVENTOR(S) : SHIGEKI KATO, ET AL.

It is certified that error appears in the above-indentified patent and that said Letters Patent is hereby corrected as shown below:

COLUMN 1

Line 7, "continuation-in-part" should read --continuation--.

COLUMN 2

Line 1, "object" should read --objects--.
　　　Line 29, "view" should read --views--.

COLUMN 3

Line 4, "viewing" should read --view showing--.
　　　Line 42, "from" should read --form--.

COLUMN 5

Line 5, "elements" should read --elements,--.
　　　Line 41, "During the" should read --During this--.
　　　Line 44, "(first and" should read --the--.
　　　Line 45, "second occurrence)" should be deleted.
　　　Line 46, "change in" should read --a change in the--.

COLUMN 6

Line 9, "an" should read --a--.

COLUMN 7

Line 47, "a-a'" should read --7B-7B--.
　　　Line 48, "b-b" should be deleted.

UNITED STATES PATENT AND TRADEMARK OFFICE
CERTIFICATE OF CORRECTION

PATENT NO. : 5,657,125

DATED : August 12, 1997

INVENTOR(S) : SHIGEKI KATO, ET AL.

It is certified that error appears in the above-indentified patent and that said Letters Patent is hereby corrected as shown below:

COLUMN 9

Line 26, "Order" should read --order--.
    Line 30, "cross-section a-a'" should read --cross section 13B-13B--; and "cross-section b-b'" should read --cross-section 13C-13C--.

COLUMN 10

Line 39, "light $R_0^{+1}$ should read --light $R_{0-1}^{+1}$--.

COLUMN 11

Line 12, "light $R_{+1}^{-}$" should read --light $R_{+1}^{-1}{}_0$--.
    Line 13, "$1_0$" should be deleted.

COLUMN 12

Line 21, "dispalcement" should read --displacement--.
    Line 22, "13C.Without" should read --13C, without--.
    Line 58, "elements" should read --element--.

COLUMN 13

Line 16, "airtight sealed." should read --airtight--.
    Line 17, "embodiment," should read --embodiments,--.
    Line 34, "Which" should read --which--.
    Line 46, "serving" should read --serves--.

UNITED STATES PATENT AND TRADEMARK OFFICE
CERTIFICATE OF CORRECTION

PATENT NO. : 5,657,125

DATED : August 12, 1997

INVENTOR(S) : SHIGEKI KATO, ET AL.

It is certified that error appears in the above-indentified patent and that said Letters Patent is hereby corrected as shown below:

COLUMN 14

Line 32, "are" should read --is--.
Line 57, "diffract" should read --diffraction--.
Line 63, "Vertically" should read --vertically--.

COLUMN 15

Line 32, "and" should read --and $R_{0\ +1}^{-1}$--.
Line 33, "interfere" should read --interference--.
Line 51, "receive" should read --receive the--.

COLUMN 16

Line 36, "electrical terminal" should read --the electrical terminals--.

COLUMN 17

Line 11, "in" should read --In--.
Line 55, "so" should read --so as to--.
Line 56, delete "that".

UNITED STATES PATENT AND TRADEMARK OFFICE
CERTIFICATE OF CORRECTION

PATENT NO. : 5,657,125
DATED : August 12, 1997
INVENTOR(S) : SHIGEKI KATO, ET AL.

It is certified that error appears in the above-indentified patent and that said Letters Patent is hereby corrected as shown below:

COLUMN 19

Line 6, "are" should read --is--.
Line 26, "laminatedly" should read --laminatedly,--.

Signed and Sealed this

Twenty-fourth Day of March, 1998

Attest:

BRUCE LEHMAN

Attesting Officer      Commissioner of Patents and Trademarks